US009710561B2

United States Patent
Kim et al.

(10) Patent No.: US 9,710,561 B2
(45) Date of Patent: *Jul. 18, 2017

(54) SYSTEMS AND METHODS FOR DETERMINING INFLUENCERS IN A SOCIAL DATA NETWORK

(71) Applicant: Sysomos L.P., Toronto (CA)

(72) Inventors: Edward Dong-Jin Kim, Toronto (CA); Brian Jia-Lee Keng, Thornhill (CA)

(73) Assignee: Sysomos L.P., Toronto (CA)

( * ) Notice: Subject to any disclaimer, the term of this patent is extended or adjusted under 35 U.S.C. 154(b) by 349 days.

This patent is subject to a terminal disclaimer.

(21) Appl. No.: 14/522,471

(22) Filed: Oct. 23, 2014

(65) Prior Publication Data

US 2015/0120713 A1    Apr. 30, 2015

Related U.S. Application Data

(60) Provisional application No. 61/895,539, filed on Oct. 25, 2013, provisional application No. 61/907,878, (Continued)

(51) Int. Cl.
*G06F 17/30* (2006.01)
*H04L 29/08* (2006.01)
(Continued)

(52) U.S. Cl.
CPC .... *G06F 17/30867* (2013.01); *G06F 17/3053* (2013.01); *G06F 17/30554* (2013.01);
(Continued)

(58) Field of Classification Search
CPC .................................................. G06Q 50/01
See application file for complete search history.

(56) References Cited

U.S. PATENT DOCUMENTS 8,312,056 B1    11/2012 Peng et al.
2008/0162260 A1    7/2008 Rohan et al.
(Continued)

OTHER PUBLICATIONS

Chidambaranathan, S., and S. John Peter. "Detection of Outlier-Communities using Minimum Spanning Tree." Journal of Emerging Trends in Computing and Information Sciences 2.11 (2011): 608-614.*

(Continued)

*Primary Examiner* — William Spieler
(74) *Attorney, Agent, or Firm* — Blake, Cassels & Graydon LLP; Wilfred P. So

(57) ABSTRACT

A system and method performed by a server for determining at least one user account that is influential for a topic: obtaining the topic; determining a plurality of user accounts within a social data network that are related to the topic; representing each of the user accounts as a node in a connected graph and determining an existence of a relationship between each of the user accounts; computing a topic network graph using each of the user accounts as nodes and the corresponding relationships as edges between each of the nodes; ranking the user accounts within the topic network graph to filter outlier nodes within the topic network graph; identifying at least two distinct communities amongst the user accounts within the filtered topic network graph, each community associated with a subset of the user accounts; identifying attributes associated with each community; outputting each community associated with the corresponding attributes.

19 Claims, 23 Drawing Sheets

Related U.S. Application Data filed on Nov. 22, 2013, provisional application No. 62/020,833, filed on Jul. 3, 2014.

(51) Int. Cl.
*G06Q 50/00* (2012.01)
*H04W 4/20* (2009.01)
*G06Q 30/02* (2012.01)

(52) U.S. Cl.
CPC ....... *G06F 17/30958* (2013.01); *G06Q 30/02* (2013.01); *G06Q 50/01* (2013.01); *H04L 67/10* (2013.01); *H04W 4/206* (2013.01)

(56) References Cited

U.S. PATENT DOCUMENTS

| | | | |
|---|---|---|---|
| 2009/0030916 A1* | 1/2009 | Andersen | G06F 17/30864 |
| 2009/0119173 A1 | 5/2009 | Parsons et al. | |
| 2009/0132652 A1 | 5/2009 | Athale et al. | |
| 2009/0271289 A1* | 10/2009 | Klinger | G06Q 30/0601 705/26.1 |
| 2009/0276389 A1 | 11/2009 | Constantine et al. | |
| 2009/0307057 A1 | 12/2009 | Azout et al. | |
| 2009/0319518 A1 | 12/2009 | Kudos et al. | |
| 2010/0057536 A1 | 3/2010 | Stefik et al. | |
| 2010/0119053 A1* | 5/2010 | Goeldi | G06Q 10/00 379/265.09 |
| 2010/0145777 A1* | 6/2010 | Ghosh | G06Q 30/02 705/14.1 |
| 2010/0332312 A1* | 12/2010 | Klinger | G06Q 10/10 705/14.43 |
| 2012/0117059 A1 | 5/2012 | Bailey et al. | |
| 2012/0254184 A1* | 10/2012 | Choudhary | G06Q 50/01 707/738 |
| 2012/0324004 A1 | 12/2012 | Le et al. | |
| 2013/0124437 A1 | 5/2013 | Pennacchiotti et al. | |
| 2013/0185791 A1* | 7/2013 | Xie | G06F 21/316 726/22 |
| 2013/0212479 A1 | 8/2013 | Willis et al. | |
| 2013/0218640 A1 | 8/2013 | Kidder et al. | |
| 2013/0268595 A1 | 10/2013 | Mohan et al. | |
| 2014/0354649 A1 | 12/2014 | Aksu | |

OTHER PUBLICATIONS

Garas, Antonios, Frank Schweitzer, and Shlomo Havlin. "A k-shell decomposition method for weighted networks." New Journal of Physics 14.8 (2012): 083030.*

Loureiro et al; "Outlier Detection Using Clustering Methods: a data cleaning application"; 2004.

Weng et al; TwitterRank: Finding Topic-Sensitive Influential Twiterers; Feb. 4, 2010.

Newman, M.E.J. (2006); "Modularity and community structure in networks"; Proceedings—National Academy of Sciences USA 103(23); 8577-8696.

Lau, Albert; International Search Report issued in related PCT Application No. PCT/CA2014/051033; search completed Nov. 24, 2014.

Lau, Albert; International Search Report issued in related PCT Application No. PCT/CA2014/051032; search completed Nov. 26, 2014.

Farr J. N., Jenkins J. J., Paterson D. G. , Simplification of Flesch Reading Ease Formula, Journal of Applied Psychology) (1951).

Sahami, M.; Dumais S.; Heckerman D.; and Horvitz E.; "A Bayesian approach to filtering junk e-mail"; in AAAI-98 Workshop on Learning for Text Categorization, pp. 55-62, 1998.

Chakrabarti, Soumen; Kaufmann, Morgan; "Mining the Web: Discovering Knowledge from Hypertext Data"; 2003.

Fung, G. P. C. ; Yu, J. X.; Yu, P. S.; Lu, H.; "Parameter free bursty events detection in text streams"; In Proceedings of the 31st International Conference on Very Large Data Bases, Trondheim, Norway, pp. 181-192, 2005.

Fagin, R.; Kumar, R.; Sivakumar, D; "Comparing top k lists." PODS: 23th ACM SIGACT—SIGMOD—SIGART Symposium on Principles of Database Systems; 2004; SIJDM: SIAM Journal on Discrete Mathematics, 17, 2003.

Manku, G. S.; Rajagopalan, S.; Lindsay, B. G.; "Approximate medians and other quantiles in one pass and with limited memory"; In Proceedings of the ACM SIGMOD International Conference on Management of Data, New York, 1998.

Church, K. W.; Hanks, P. ; "Word Association Norms"; Mutual Information and Lexicography. In ACL, 1989.

Gyongyi, Z.; Garcia-Molina, H.; Petersen, J.; "Combating Web Spam with TrustRank"; In VLDB, 2004; Haveliwala, T. Topic-Sensitive PageRank. In WWW, 2002.

Chandel, A.; Hassanzadeh, O.; Koudas, N.; Sadoghi, M.; Srivastava., D.; "Benchmarking Declarative Approximate Selection Predicates"; In SIGMOD, 2007.

Crestani, F.; "Application of Spreading Activation Techniques in Information Retrieval"; In Artificial Intelligence Review, 1997.

Feller, W.; "An Introduction to Probability Theory and Its Applications"; Wiley, 1968.

Manning, Christopher D; Schütze, Hinrich; "Foundations of Statistical Natural Language Processing"; MIT Press 2000.

Page, Lawrence; Brin, Sergey; Motwani, Rajeev and Winograd, Terry; The PageRank citation ranking; Bringing Order to the Web; 1999.

Gephi, an open-source network analysis and visualization software package. www.gephi.org.

Kim, E.D.; Keng, B.; Contextual Influencer Graphs on Social Networks; Technical white paper (Sysomos blog).

Blondel, V.D.; Guillaume, J.-L.; Lambiotte, R. and Lefebvre, E.; Fast unfolding of community hierarchies in large networks; J-Stat. Mech. 2008 (10): P1008.doi:10.1088/1742-5468/2008/10/P1008.

Kim, E.D.; Keng, B.; Influencer Communities; Technical white paper (Sysomos blog).

D3 (Data-Driven Documents); Javascript Library; www.d3js.org; retrieved from the Internet Mar. 3, 2015.

Fortunato, Santo. "Community detection in graphs." Physics reports 486.3 (2010): 75-174.

International Search Report issued in related PCT Application No. PCT/CA2014/051029; search completed Nov. 27, 2014.

* cited by examiner

Network Graph Communities

Influencer Communities graphic for the Adidas Running topic.

Influencer Community 1 for the Adidas Running topic

*Influencer Community 3 for the Adidas Running topic*

*Influencer Community 1 graphic for the Dove topic.*

Influencer Community 2 graphic for the Dove topic.

SYSTEMS AND METHODS FOR DETERMINING INFLUENCERS IN A SOCIAL DATA NETWORK

CROSS-REFERENCE TO RELATED APPLICATIONS

This application claims priority to U.S. Provisional Patent Application No. 61/895,539 filed on Oct. 25, 2013, titled "Systems and Methods for Determining Influencers in a Social Data Network", and U.S. Provisional Patent Application No. 61/907,878 filed on Nov. 22, 2013, titled "Systems and Methods for Identifying Influencers and Their Communities in a Social Data Network", and U.S. Provisional Patent Application No. 62/020,833 filed on Jul. 3, 2014, titled "Systems and Methods for Dynamically Determining Influencers in a Social Data Network Using Weighted Analysis" and the entire contents of which are incorporated herein by reference.

TECHNICAL FIELD

The following generally relates to analysing social network data.

BACKGROUND

In recent years social media has become a popular way for individuals and consumers to interact online (e.g. on the Internet). Social media also affects the way businesses aim to interact with their customers, fans, and potential customers online.

Some bloggers on particular topics with a wide following are identified and are used to endorse or sponsor specific products. For example, advertisement space on a popular blogger's website is used to advertise related products and services.

Social network platforms are also used to influence groups of people. Examples of social network platforms include those known by the trade names Facebook, Twitter, LinkedIn, Tumblr, and Pinterest. Popular or expert individuals within a social network platform can be used to market to other people. Quickly identifying popular or influential individuals becomes more difficult when the number of users within a social network grows. Furthermore, accurately identifying influential individuals within a particular topic is difficult. The experts or those users who are popular in a social network are herein interchangeably referred to as "influencers".

BRIEF DESCRIPTION OF THE DRAWINGS

Embodiments will now be described by way of example only with reference to the appended drawings wherein.

DETAILED DESCRIPTION OF THE DRAWINGS

Figure 1:
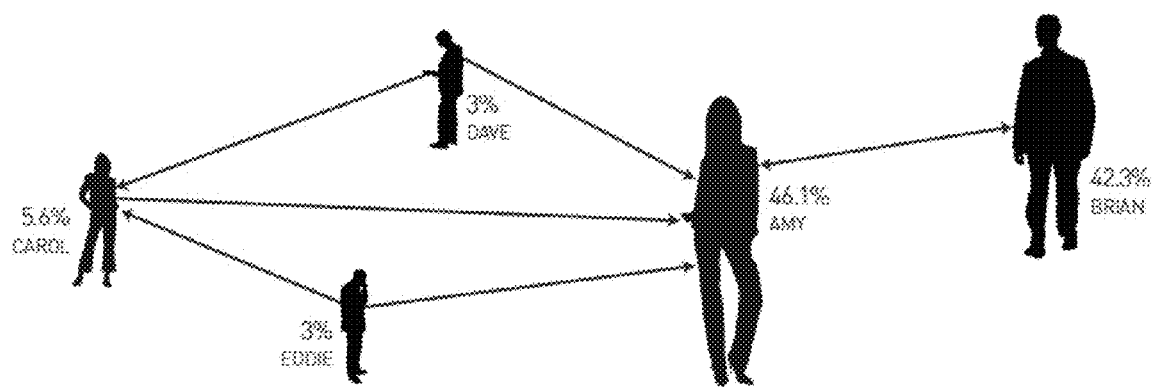
FIG. 1 is a diagram illustrating users in connection with each other in a social data network.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Social networking platforms include users who generate and post content for others to see, hear, etc (e.g. via a network of computing devices communicating through websites associated with the social networking platform). Non-limiting examples of social networking platforms are Facebook, Twitter, LinkedIn, Pinterest, Tumblr, blogospheres, websites, collaborative wikis, online newsgroups, online forums, emails, and instant messaging services. Currently known and future known social networking platforms may be used with principles described herein. Social networking platforms can be used to market to, and advertise to, users of the platforms. It is recognized that it is difficult to identify users relevant to a given topic. This includes identifying influential users on a given topic.

As used herein, the term "influencer" refers to a user account that primarily produces and shares content related to a topic and is considered to be influential to other users in the social data network. The term "follower", as used herein, refers to a first user account (e.g. the first user account associated with one or more social networking platforms accessed via a computing device) that follows a second user account (e.g. the second user account associated with at least one of the social networking platforms of the first user account and accessed via a computing device), such that content posted by the second user account is published for the first user account to read, consume, etc. For example, when a first user follows a second user, the first user (i.e. the follower) will receive content posted by the second user. A user with an "interest" on a particular topic herein refers to a user account that follows a number of experts (e.g. associated with the social networking platform) in the particular topic. In some cases, a follower engages with the content posted by the other user (e.g. by sharing or reposting the content).

Identifying the key influencers is desirable for companies in order, for example, to target individuals who can potentially broadcast and endorse a brand's message. Engaging these individuals allows control over a brand's online message and may reduce the potential negative sentiment that may occur. Careful management of this process may lead to exponential growth in online mindshare, for example, in the case of viral marketing campaigns.

Most past approaches to determining influencers have focused on easily calculable metrics such as the number of followers or friends, or the number of posts. While the aggregated followers or friends count may approximate the overall social network, it provides little data in the way of computing metrics that indicate the influence of a user or individual with respect to a company or brand. This leads to noisy influencer results and wasted time sifting through the massive volume of potential users.

Several social media analytics companies claim to provide influencer scores for social networks. However, it is herein recognized that many companies use a metric that is not a true influencer metric, but an algebraic formula of the number of followers and the number of mentions (e.g. "tweets" for Twitter, posts, messages, etc.). For instance, some of the known approaches use a logarithmic normalization of these numbers that allocates approximately 80% of the weight to the follower counts and the remainder to the number of mentions.

The reason for using an algebraic formula is that the counting or tallying of followers and mentions are instantly updated in the user profile for a social network. Hence, the computation is very fast and easy to report. This is often called an Authority metric or Authority score to distinguish it from true influencer analysis. However, there are several significant drawbacks to the Authority score approach.

It is herein recognized that this Authority score is context insensitive. This is a static metric irrespective of the topic or query. For example, regardless of the topic, mass media outlets like the New York Times or CNN would get the highest ranking since they have millions of followers. Therefore, it is not context-sensitive.

It is also herein recognized that this Authority metric has a high follower count bias. If there is a well-defined specialist in a certain field with a limited number of followers, but all of them are also experts, they will never show up in the top 20 to 100 results due to their low follower count. Effectively, all the followers are treated as having equal weight, which has been shown to be an incorrect assumption in network analytics research.

The proposed systems and methods, as described herein, may dynamically calculate influencers with respect to the query topic, and may account for the influence of their followers.

It is also recognized that the recursive nature of the influencer relation is a challenge in implementing influencer identification on a massive scale. By way of example, consider a situation where there are individuals A, B and C with: A following B and C; B following C and A; and C following only A. Then the influence of A is dependent on C, which in turn is dependent on A and B, and so on. In this way, the influencer relationships have a recursive nature.

More generally, the proposed systems and methods provide a way to determine the influencers in a social data network.

As an example, consider the simplified follower network for a particular topic in FIG. 1. Each user, actually a user account or a user name associated with a user account or user data address, is shown in relationship to the other users. The lines between the users, also called edges, represent relationships between the users. For example, an arrow pointing from the user account "Dave" to the user account "Carol" means Dave reads messages published by Carol. In other words, Dave follows Carol. A bi-directional arrow between Amy and Brian means, for example, Amy follows Dave and Dave follows Amy. Beside each user account in FIG. 1, a PageRank score is provided. The PageRank algorithm is a known algorithm used by Google to measure the importance of website pages in a network and can be also applied to measuring the importance of users in a social data network.

Continuing with FIG. 1, Amy has the greatest number of followers (i.e. Dave, Carol, and Eddie) and is the most influential user in this network (i.e. PageRank score of 46.1%). However, Brian, with only one follower (i.e. Amy), is more influential than Carol with two followers (i.e. Eddie and Dave), primarily because Brian has a significant portion of Amy's mindshare. In other words, using the proposed systems and methods herein, although Carol has more followers than Brian, she does not necessarily have a greater influence than Brian. Hence, using the proposed systems and methods described herein, the number of followers of a user is not the sole determination for influence. In an example embodiment, identifying who are the followers of a user may also be factored into the computation of influence.

The example network in FIG. 1 is represented in Table 1, and it illustrates how PageRank can significantly differ from the number of followers.

TABLE 1

Twitter follower counts and PageRank scores for sample network represented in FIG. 1.

| User Handle | Follower Count | PageRank |
|---|---|---|
| Amy | 4 | 46.1% |
| Brian | 1 | 42.3% |
| Carol | 2 | 5.6% |
| Dave | 0 | 3.0% |
| Eddie | 0 | 3.0% |

Amy is clearly the top influencer with the greatest number of followers and highest PageRank score. Although Carol has two followers, she has a lower PageRank metric than Brian who has one follower. However, Brian's one follower is the most-influential Amy (with four followers), while Carol's two followers are low influencers with (0 followers each). The intuition is that, if a few experts consider someone an expert, then s/he is also an expert. However, the PageRank algorithm gives a better measure of influence than only counting the number of followers. As will be described below, the PageRank algorithm and other similar ranking algorithms can be used with the proposed systems and methods described herein.

The proposed systems and methods may be used to determine the key influencers for a given topic in a social data network.

In an example embodiment, the proposed system and methods can be used to determine that influencers in Topic A are also influencers in one or more other topics (e.g. Topic B, Topic C, etc.).

Figure 2:
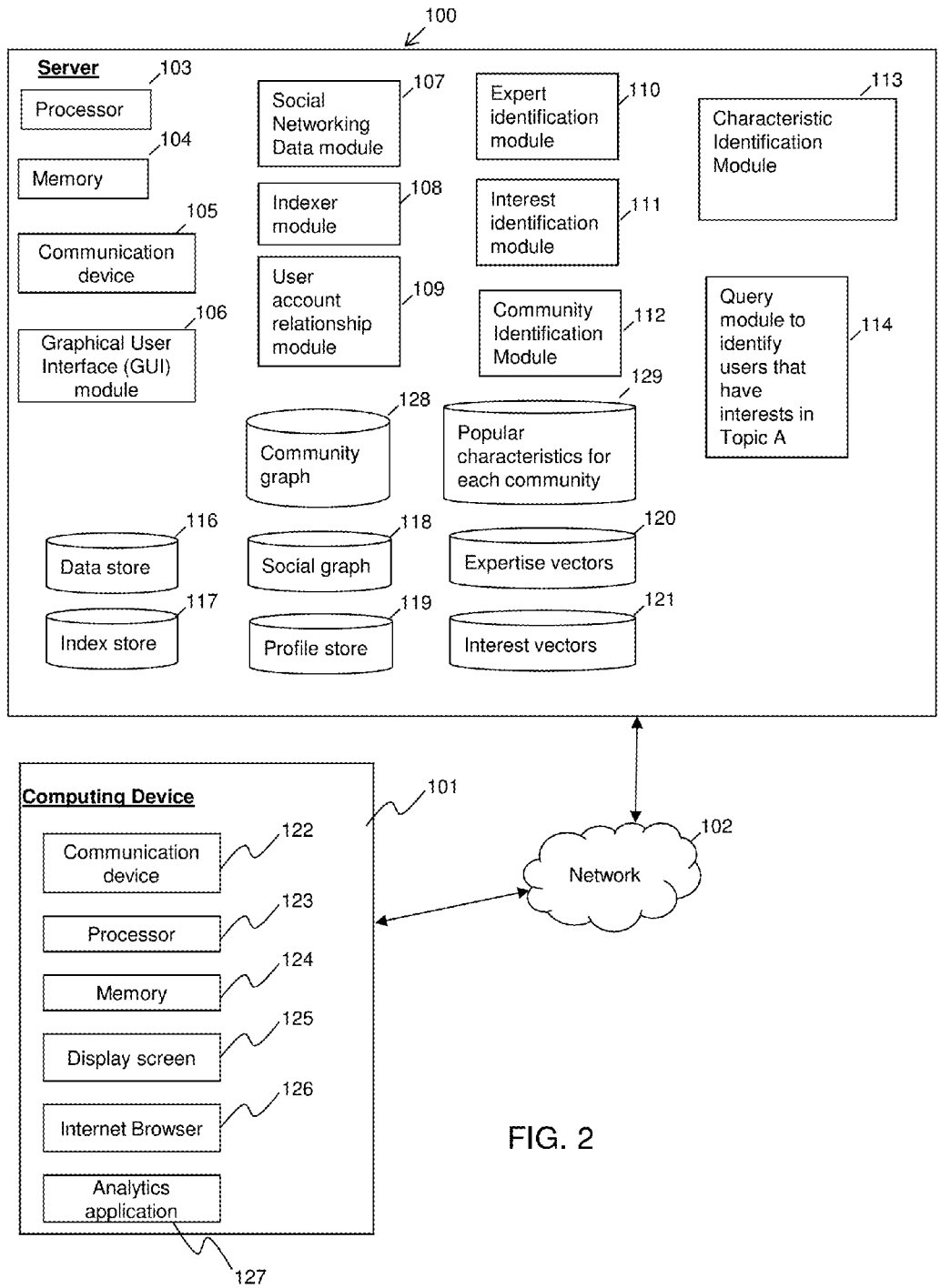
FIG. 2 is a schematic diagram of a server in communication with a computing device.

Turning to FIG. 2, a schematic diagram of a proposed system is shown. A server 100 is in communication with a computing device 101 over a network 102. The server 100 obtains and analyzes social network data and provides results to the computing device 101 over the network. The computing device 101 can receive user inputs through a GUI to control parameters for the analysis.

It can be appreciated that social network data includes data about the users of the social network platform, as well as the content generated or organized, or both, by the users. Non-limiting examples of social network data includes the user account ID or user name, a description of the user or user account, the messages or other data posted by the user, connections between the user and other users, location information, etc. An example of connections is a "user list", also herein called "list", which includes a name of the list, a description of the list, and one or more other users which the given user follows. The user list is, for example, created by the given user.

Continuing with FIG. 2, the server 100 includes a processor 103 and a memory device 104. In an example embodiment, the server includes one or more processors and a large amount of memory capacity. In another example embodiment, the memory device 104 or memory devices are solid state drives for increased read/write performance. In another example embodiment, multiple servers are used to implement the methods described herein. In other words, in an example embodiment, the server 100 refers to a server system. In another example embodiment, other currently known computing hardware or future known computing hardware is used, or both.

The server 100 also includes a communication device 105 to communicate via the network 102. The network 102 may be a wired or wireless network, or both. The server 100 also includes a GUI module 106 for displaying and receiving data via the computing device 101. The server also includes: a social networking data module 107; an indexer module 108; a user account relationship module 109; an expert identification module 110; an interest identification module 111; a query module to identify user that have interests in Topic A (e.g. a given topic) 114, a community identification module 112 and a characteristic identification module 113. As will be described, the community identification module 112 is configured to define communities or cluster of data based on a network graph of relationships identified by the expert identification module The server 100 also includes a number of databases, including a data store 116; an index store 117; a database for a social graph 118; a profile store 119; a database for expertise vectors 120; a database for interest vectors 121, a database for storing community graph information 128, and a database for storing popular characteristics for each community 129 and storing pre-defined characteristics to be searched within each community, the communities as defined by community identification module 112.

The social networking data module 107 is used to receive a stream of social networking data. In an example embodiment, millions of new messages are delivered to social networking data module 107 each day, and in real-time. The social networking data received by the social networking data module 107 is stored in the data store 116.

The indexer module 108 performs an indexer process on the data in the data store 116 and stores the indexed data in the index store 117. In an example embodiment, the indexed data in the index store 117 can be more easily searched, and the identifiers in the index store can be used to retrieve the actual data (e.g. full messages).

A social graph is also obtained from the social networking platform server, not shown, and is stored in the social graph database 118. The social graph, when given a user as an input to a query, can be used to return all users following the queried user.

The profile store 119 stores meta data related to user profiles. Examples of profile related meta data include the aggregate number of followers of a given user, self-disclosed personal information of the given user, location information of the given user, etc. The data in the profile store 119 can be queried.

In an example embodiment, the user account relationship module 109 can use the social graph 118 and the profile store 119 to determine which users are following a particular user.

The expert identification module 110 is configured to identify the set of all user lists in which a user account is listed, called the expertise vector. The expertise vector for a user is stored in the expertise vector database 120. The interest identification module 111 is configured to identify topics of interest to a given user, called the interest vector. The interest vector for a user is stored in the interest vector database 121.

Referring again to FIG. 2, the server 100 further comprises a community identification module 112 that is configured to identify communities (e.g. a cluster of information within a queried topic such as Topic A) within a topic network and associated influencer as identified by the expert identification module 110. As will be described with reference to FIG. 3, the topic network illustrates the graph of influential users and their relationships (e.g. as defined by the expert identification module 110 and/or social graph 118). The output from a community identification module 112 comprises a visual identification of clusters (e.g. color coded) defined as communities of the topic network that contain common characteristics and/or are affected (e.g. influenced such as follower-followed relationships), to a higher degree by other entities (e.g. influencers) in the same community than those in another community. The server 100 further comprises a characteristic identification module 113.

The characteristic identification module 113 is configured to receive the identified communities from the community identification module 112 and provide an identification of popular characteristics (e.g. topic of conversation) among the community members. The results of the characteristic identification module 113, can be visually linked to the corresponding visualization of the community as provided in the community identification module 112. As will be described, in one aspect, the results of the community identification module 112 (e.g. a plurality of communities) and/or characteristic identification module 113 (e.g. a plurality of popular characteristics within each community) are displayed on the display screen 125 as output to the computing device 101. In yet a further aspect, the GUI module 106 is configured to receive input from the computing device 101 for selection of a particular community as identified by the community identification module 112. The GUI module 106 is then configured to communicate with the characteristic identification module 113, to provide an output of results for a particular characteristic (e.g. defining popular conversations) as associated with the selected community (e.g. for all influential users within the selected community). The results of the characteristic identification module 112 (e.g. a word cloud to visually define popular conversations among users of the selected community) can be displayed on the display screen 125 alongside the particular selected community and/or a listing of users within the particular selected community.

Continuing with FIG. 2, the computing device 101 includes a communication device 122 to communicate with the server 100 via the network 102, a processor 123, a memory device 124, a display screen 125, and an Internet browser 126. In an example embodiment, the GUI provided by the server 100 is displayed by the computing device 101 through the Internet browser. In another example embodiment, where an analytics application 127 is available on the computing device 101, the GUI is displayed by the computing device through the analytics application 127. It can be appreciated that the display device 125 may be part of the computing device (e.g. as with a mobile device, a tablet, a laptop, etc.) or may be separate from the computing device (e.g. as with a desktop computer, or the like).

Although not shown, various user input devices (e.g. touch screen, roller ball, optical mouse, buttons, keyboard, microphone, etc.) can be used to facilitate interaction between the user and the computing device 101.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server 100 or computing device 101 or accessible or connectable thereto. Any application or module herein described may be implemented using computer readable/ executable instructions that may be stored or otherwise held by such computer readable media.

Figure 3:
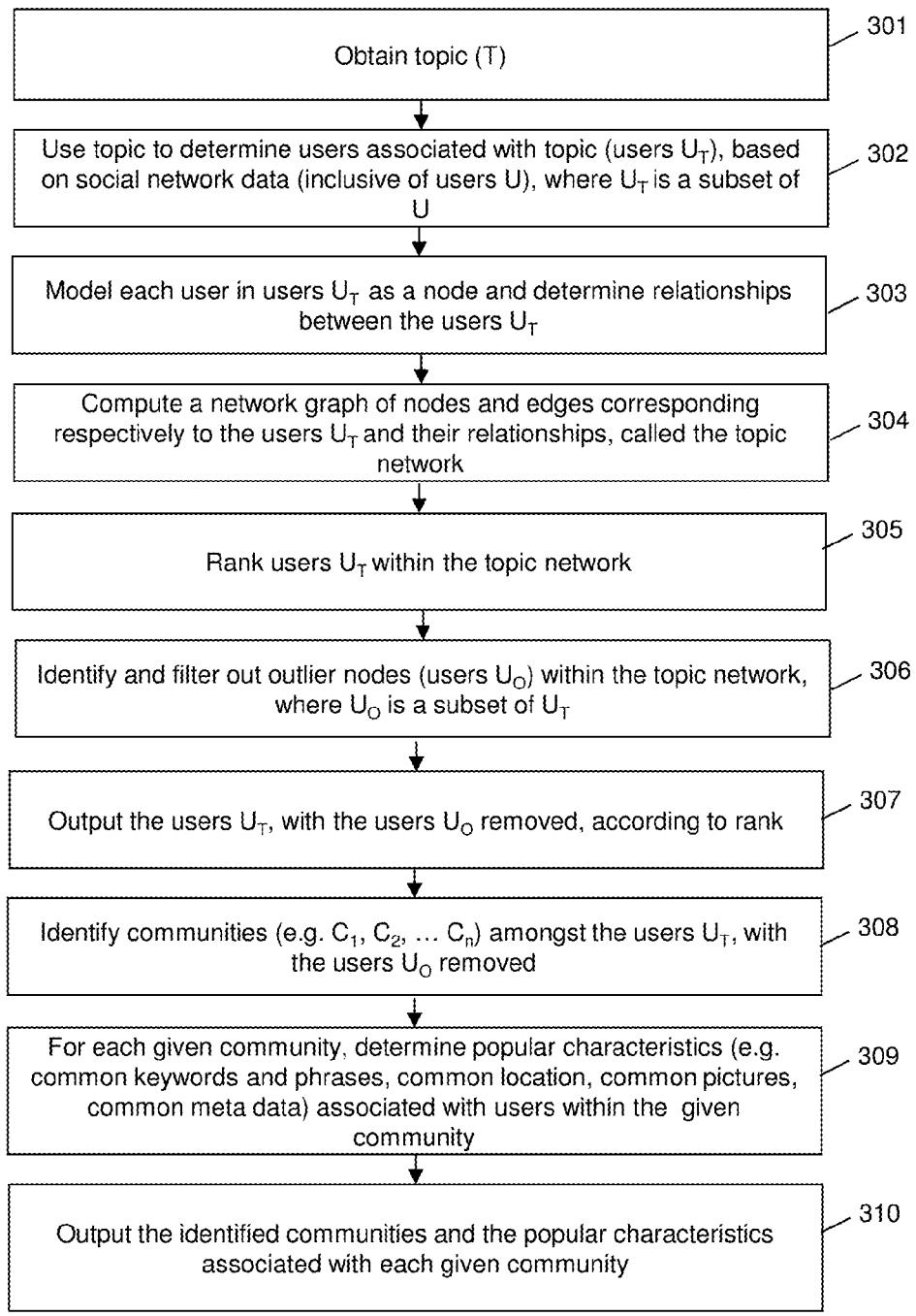
FIG. 3 is a flow diagram of an example embodiment of computer executable instructions for determining influencers associated with a topic.

Turning to FIG. 3, an example embodiment of computer executable instructions are shown for determining one or more influencers of a given topic. The process shown in FIG. 3 assumes that social network data is available to the server 100, and the social network data includes multiple users that are represented as a set U. At block 301, the server 100 obtains a topic represented as T. For example, a user may enter in a topic via a GUI displayed at the computing device 101, and the computing device 101 sends the topic to the server 100. The topic may also be obtained without user input. At block 302, the server uses the topic to determine users from the social network data which are associated with the topic. This determination can be implemented in various ways and will be discussed in further detail below. The set of users associated with the topic is represented as $U_T$, where $U_T$ is a subset of U.

Continuing with FIG. 3, the server models each user in the set of users $U_T$ as a node and determines the relationships between the users $U_T$ (block 303). The server computes a network of nodes and edges corresponding respectively to the users $U_T$ and the relationships between the users $U_T$ (block 304). In other words, the server creates a network graph of nodes and edges corresponding respectively to the users $U_T$ and their relationships. The network graph is called the "topic network". It can be appreciated that the principles of graph theory are applied here. The relationships that define the edges or connectedness between two entities or users $U_T$ can include for example: friend connection and/or follower-followee connection between the two entities within a particular social networking platform. In an additional aspect, the relationships could include other types of relationships defining social media connectedness between two entities such as: friend of a friend connection. In yet another aspect, the relationship could include connectedness of a friend or follower connection across different social network platforms (e.g. Instagram and Facebook). In yet a further aspect, the relationship between the users $U_T$ as defined by the edges can include for example: users connected via re-posts of messages by one user as originally posted by another user (e.g. re-tweets on Twitter), and/or users connected through replies to messages posted by one user and commented by another user via the social networking platform. Referring again to FIG. 3, the presence of an edge between two entities indicates the presence of at least one type of relationship or connectedness (e.g. friend or follower connectivity between two users) in one or more social networking platforms.

The server then ranks users within the topic network (block 305). For example, the server uses PageRank to measure importance of a user within the topic network and to rank the user based on the measure. Other non-limiting examples of ranking algorithms that can be used include: Eigenvector Centrality, Weighted Degree, Betweenness, Hub and Authority metrics.

The server identifies and filters out outlier nodes within the topic network (block 306). The outlier nodes are outlier users that are considered to be separate from a larger population or clusters of users in the topic network. The set of outlier users or nodes within the topic network is represented by $U_O$, where $U_O$ is a subset of $U_T$. Further details about identifying and filtering the outlier nodes are described below.

At block 307, server outputs the users $U_T$, with the users $U_O$ removed, according to rank.

In an alternate example embodiment, block 306 is performed before block 305.

At block 308, the server identifies communities (e.g. $C_1$, $C_2$, . . . , $C_n$) amongst the users $U_T$ with the users $U_O$ removed. The identification of the communities can depend on the degree of connectedness between nodes within one community as compared to nodes within another community. That is, a community is defined by entities or nodes having a higher degree of connectedness internally (e.g. with respect to other nodes in the same community) than with respect to entities external to the defined community. As will be defined, the value or threshold for the degree of connectedness used to separate one community from another can be pre-defined (e.g. as provided by the community graph database 128 and/or user-defined from computing device 101). The resolution thus defines the density of the interconnectedness of the nodes within a community. Each identified community graph is thus a subset of the network graph of nodes and edges (the topic network) defined in block 304 for each community. In one aspect, the community graph further displays both a visual representation of the users in the community (e.g. as nodes) with the community graph and a textual listing of the users in the community (e.g. as provided to display screen 125 of FIG. 1). In yet a further aspect, the display of the listing of users in the community is ranked according to degree of influence within the community and/or within all communities for topic T (e.g. as provided to display screen 125 of FIG. 1). In accordance with block 308, users $U_T$ are then split up into their community graph classifications such as $U_{C1}, U_{C2}, \ldots U_{Cn}$.

At block 309, for each given community (e.g. $C_1$), the server determines popular characteristic values for pre-defined characteristics (e.g. one or more of: common words and phrases, topics of conversations, common locations, common pictures, common meta data) associated with users (e.g. $U_{C1}$) within the given community based on their social network data. The selected characteristic (e.g. topic or location) can be user-defined (e.g. via input from the computing device 101) and/or automatically generated (e.g. based on characteristics for other communities within the same topic network, or based on previously used characteristics for the same topic T). At block 310, the server outputs the identified communities (e.g. $C_1, C_2, \ldots, C_n$) and the popular characteristics associated with each given community. The identified communities can be output (e.g. via the server for display on the display screen 125) as a community graph in visual association with the characteristic values for a pre-defined characteristic for each community.

Figure 4:
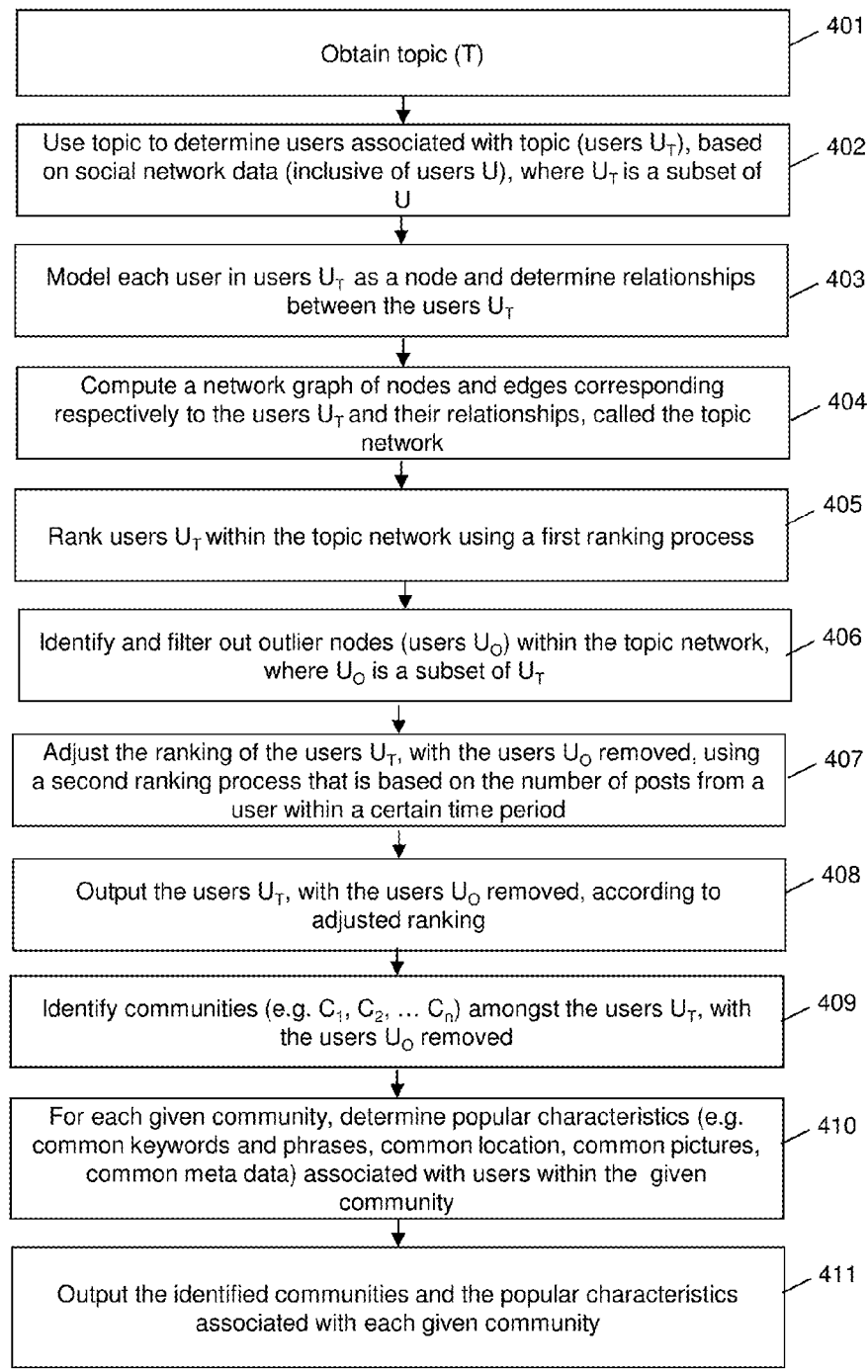
FIG. 4 is a flow diagram of another example embodiment of computer executable instructions for determining influencers associated with a topic.

Turning to FIG. 4, another example embodiment of computer executable instructions are shown for determining one or more influencers of a given topic. Blocks 401 to 404 correspond to blocks 301 to 304. Following block 404, the server 100 ranks users within the topic network using a first ranking process (block 405). The first ranking process may or may not be the same ranking process used in block 305. The ranking is done to identify which users are the most influential in the given topic network for the given topic.

At block 406, the server identifies and filters out outlier nodes (users $U_O$) within the topic network, where $U_O$ is a subset of $U_T$. At block 407, the server adjusts the ranking of the users $U_T$, with the users $U_O$ removed, using a second ranking process that is based on the number of posts from a user within a certain time period. For example, the server determines that if a first user has a higher number of posts within the last two months compared to the number of posts of a second user within the same time period, then the first user's original ranking (from block 405) may be increased, while the second user's ranking remains the same or is decreased.

It is recognized that a network graph based on all the users U may be very large. For example, there may be hundreds of millions of users in the set U. Analysing the entire data set related to U may be computationally expensive and time consuming. Therefore, using the above process to find a smaller set of users $U_T$ that relate to the topic T reduces the amount of data to be analysed. This decreases the processing time as well. In an example embodiment, near real time results of influencers have been produced when analysing the entire social network platform of Twitter. Using the smaller set of users $U_T$ and the data associated with the user $U_T$, a new topic network is computed. The topic network is smaller (i.e. less nodes and less edges) than the social network graph that is inclusive of all users U. Ranking users based on the topic network is much faster than ranking users based on the social network graph inclusive of all users U.

Furthermore, identifying and filtering outlier nodes in the topic network helps to further improve the quality of the results.

At block 409, the server is configured to identify communities (e.g. $C_1, C_2, \ldots, C_n$) amongst the users $U_T$ with the users $U_O$ removed (e.g. utilizing the community identification module 112 of FIG. 2) in a similar manner as previously described in relation to block 308. At block 410, the server is configured to determine, for each given community (e.g. $C_1$), popular characteristic values for pre-defined characteristics (e.g. common keywords and phrases, topics of conversations, common locations, common pictures, common meta data) associated with users (e.g. $U_{C1}$) within the given community (e.g. $C_1$), based on their social network data in a similar manner as previously described in relation to block 309. At block 411, the server is configured to output the identified communities and the characteristic values for the popular characteristics associated with each given community (e.g. $C_1$-$C_n$) in a similar manner as block 310 (e.g. via a display screen associated with the server 100 and/or the computing device 101 as shown in FIG. 2).

Further details of the methods described in FIG. 3 and FIG. 4 are described below.

Obtaining Social Network Data:

With respect to obtaining social network data, although not shown in FIG. 3 or FIG. 4, it will be appreciated that the server 100 obtains social network data. The social network data may be obtained in various ways. Below is a non-limiting example embodiment of obtaining social network data.

Figure 5:
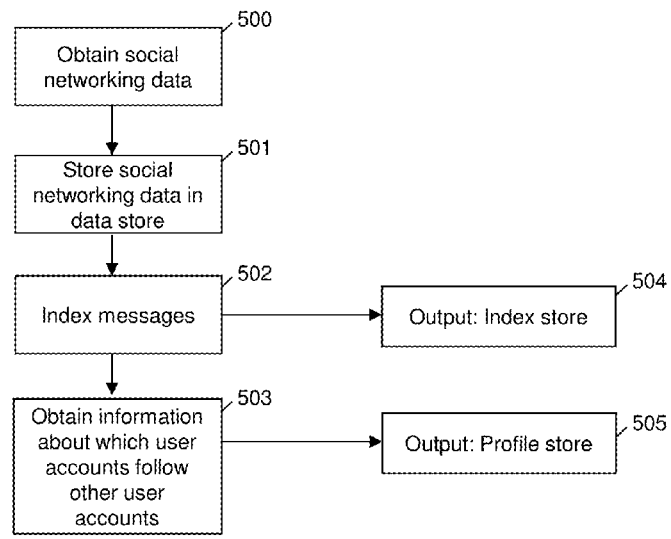
FIG. 5 is a flow diagram of an example embodiment of computer executable instructions for obtaining and storing social networking data.

Turning to FIG. 5, an example embodiment of computer executable instructions are shown for obtaining social network data. The data may be received as a stream of data, including messages and meta data, in real time. This data is stored in the data store 116, for example, using a compressed row format (block 501). In a non-limiting example embodiment, a MySQL database is used. Blocks 500 and 501, for example, are implemented by the social networking data module 107.

In an example embodiment, the social network data received by social networking module 107 is copied, and the copies of the social network data are stored across multiple servers. This facilitates parallel processing when analysing the social network data. In other words, it is possible for one server to analyse one aspect of the social network data, while another server analyses another aspect of the social network data.

The server 100 indexes the messages using an indexer process (block 502). For example, the indexer process is a separate process from the storage process that includes scanning the messages as they materialize in the data store 116. In an example embodiment, the indexer process runs on a separate server by itself. This facilitates parallel processing. The indexer process is, for example, a multi-threaded process that materializes a table of indexed data for each day, or for some other given time period. The indexed data is outputted and stored in the index store 117 (block 504).

Figure 6:
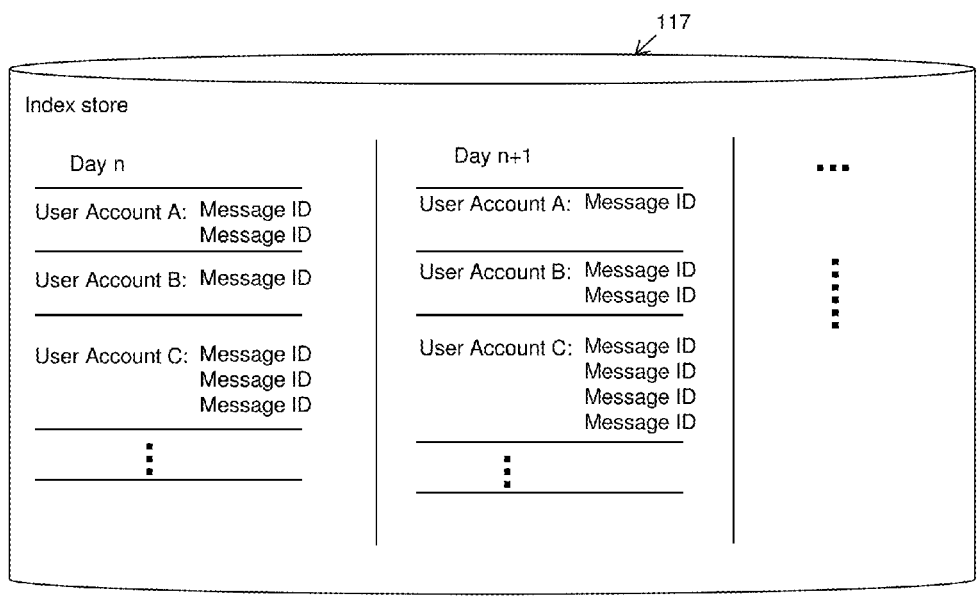
FIG. 6 is a block diagram of example data components in an index store.

Turning briefly to FIG. 6, which shows an example index store 117, each row in the table is a unique user account identifier and a corresponding list of all message identifiers that are produced that day, or that given time period. In an example embodiment, millions of rows of data can be read and written in the index store 117 each day, and this process can occur as new data is materialized or added to the data store 116. In an example embodiment, a compressed row format is used in the index store 117. In another example embodiment, deadlocks are avoided by running relaxed transactional semantics, since this increases throughput across multiple threads when reading and writing the table. By way of background, a deadlock occurs when two or more tasks permanently block each other by each task having a lock on a resource which the other tasks are trying to lock.

Turning back to FIG. 5, the server 100 further obtains information about which user accounts follow other user accounts (block 503). This process includes identifying profile related meta data and storing the same in the profile store (block 505).

Figure 7:
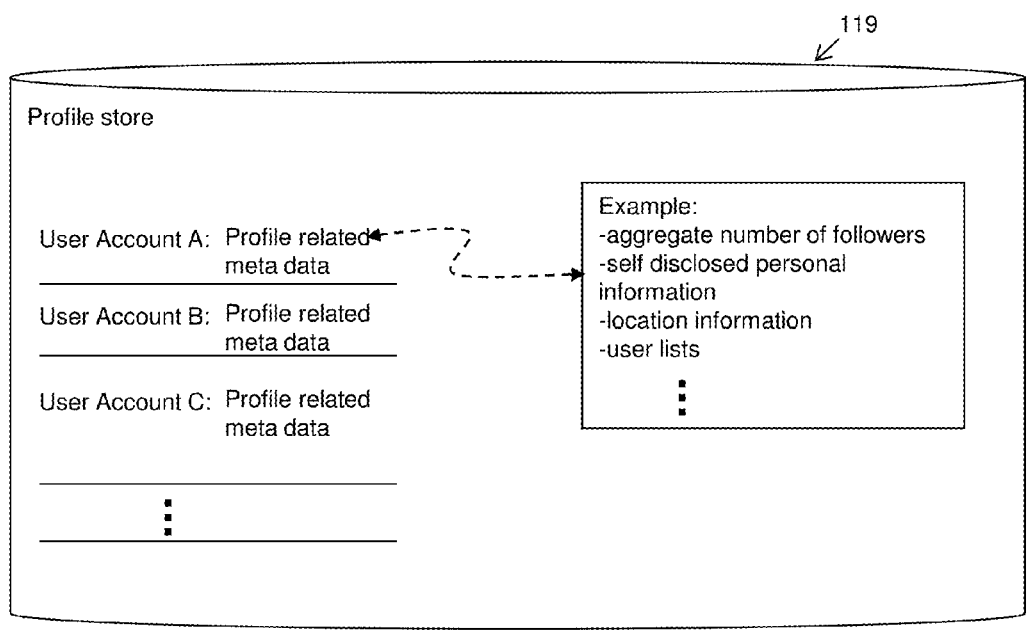
FIG. 7 is a block diagram of example data components in a profile store.

In FIG. 7, an example of the profile store 119 shows that for each user account, there is associated profile related meta data. The profile related meta data includes, for example, the aggregate number of followers of the user, self-disclosed personal information, location information, and user lists.

After the data is obtained and stored, it can be analyzed, for example, to identify experts and interests.

Determining Users Related to a Topic:

With respect to determining users related to a topic, as per blocks 302 and 402, it will be appreciated that such an operation can occur in various ways. Below are non-limiting example embodiments that can be used to determine users related to a topic.

In an example embodiment, the operation of determining users related to a topic (e.g. block 302 and block 402) is based on the Sysomos search engine, and is described in U.S. Patent Application Publication No. 2009/0319518, filed Jul. 10, 2009 and titled "Method and System for Information Discovery and Text Analysis", the entire contents of which are hereby incorporated by reference. According to the processes described in U.S. Patent Application Publication No. 2009/0319518, a topic is used to identify popular documents within a certain time interval. It is herein recognized that this process can also be used to identify users related to a topic. In particular, when a topic (e.g. a keyword) is provided to the system of U.S. Patent Application Publication No. 2009/0319518, the system returns documents (e.g. posts, tweets, messages, articles, etc.) that are related and popular to the topic. Using the proposed systems and methods described herein, the executable instructions include the server 100 determining the author or authors of the popular documents. In this way, the author or authors are identified as the top users who are related to the given topic. An upper limit n may be provided to identify the top n users who are related to the given topic, where n is an integer. In an example embodiment, n is 5000, although other numbers can be used. The top n users may be determined according to a known or future known ranking algorithm, or using known or future known authority scoring algorithm for social media analytics. For each of the top n users, the server determines the users who follow each of the top n users. Those users that are not considered as part of the top n users, or do not follow the top n users are not part of the users $U_T$ in the topic network. In an example embodiment, the set of users $U_T$ includes the top n users and their followers.

In another example embodiment of performing the operation of determining users related to a topic (e.g. block 302 and block 402), the computer executable instructions include: determining documents (e.g. posts, articles, tweets, messages, etc.) that are correlated with the given topic; determining the author or authors of the documents; and establishing the author or authors as the users $U_T$ associated with the given topic.

In another example embodiment of performing the operation of determining users related to a topic (e.g. block 302 and block 402), the operation includes identifying an expertise vector of a user. This example embodiment is explained using FIGS. 8 to 11.

Figure 8:
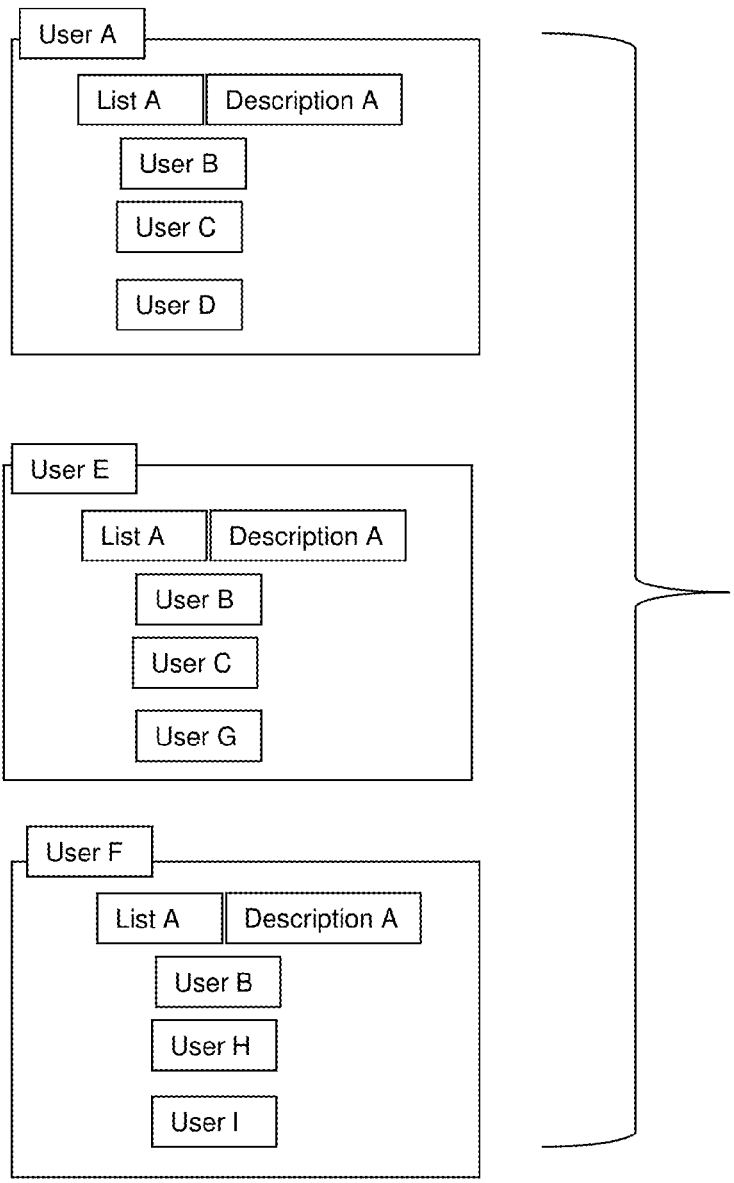
FIG. 8 is a schematic diagram of example user lists and a tally of the number of times a user is listed within different user lists.

By way of example, and turning to FIG. 8, a user may have a list of other users which he or she may follow. For example, User A has a list of User B, User C and User D, which User A follows. The users (e.g. User B, User C and User D) are grouped under a list named List A, and the list has an associated list description (e.g. Description A). In other words, User A believes that User B, User C and User D are experts or knowledgeable in Topic A.

Another user, User E, may have the same or similar list name and description (e.g. same or similar to List A, Description A), but may have different users listed than those by User A. For example, User E follows User B, User C and User G. In other words, User E believes that User B, User C and User G are experts or knowledgeable in Topic A.

Another user, User F, may have the same or similar list name and description (e.g. same or similar to List A, Description A), but may have different users listed than those by User A. For example, User F follows User B, User H and User I, since User F believes these users are experts or knowledgeable in Topic A.

Based on the above example scenario, it can be appreciated that different users may have the same or similarly named or similarly described lists, but the users in each list can be different. In other words, different users may think that other different users are experts in a given topic.

Continuing with the example in FIG. 8, based on the number of times that a user is listed on another user's list for a given topic, the server 100 can determine whether the user is considered an expert by other users. For example, User B is listed on three different lists related to Topic A; User C is listed on two different lists; and each of User D, User G, User H and User I are only listed on one list. Therefore, in this example, User B is considered the foremost expert in Topic A, followed by User C.

Figure 9:
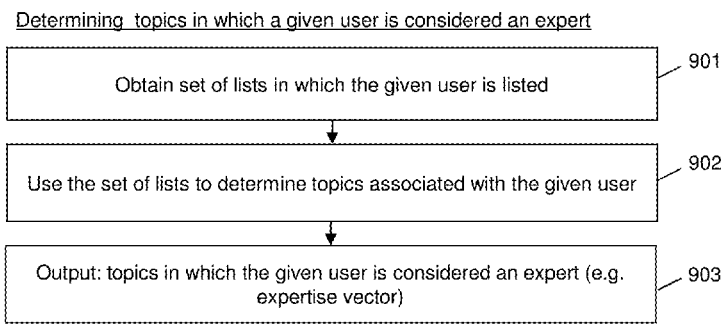
FIG. 9 is a flow diagram of an example embodiment of computer executable instructions for determining topics in which a given user is considered an expert.

Turning to FIG. 9, an example embodiment of computer executable instructions is provided for determining topics for which a given user is considered an expert. At block 901, the server 100 obtains a set of lists in which the given user listed. At block 902, the server 100 uses the set of lists to determine topics associated with the given user. At block 903, the server outputs the topics in which the given user is considered an expert. These topics form an expertise vector of the given user. For example, if the user Alice is listed in Bob's fishing list, Celine's art list, and David's photography list, then Alice's expertise vector includes: fishing, art and photography.

In an example embodiment, the user lists are obtained by constantly crawling them, since the user lists are dynamically updated by users, and new lists are created often. In an example embodiment, the user lists are processed using an Apache Lucene index. The expertise vector of a given user is processed using the Lucene algorithm to populate the index of topics associated with the given user. This index supports, for example, full Lucene query syntax, including phrase queries and Boolean logic. By way of background, Apache Lucene is an information retrieval software library that is suitable for full text indexing and searching. Lucene is also widely known for its use in the implementation of Internet search engines and local single-site searching. It can be appreciated, that other currently known or future known searching and indexing algorithms can be used.

In an example embodiment, the computer executable instructions of FIG. 9 are implemented by module 110.

Figure 10:
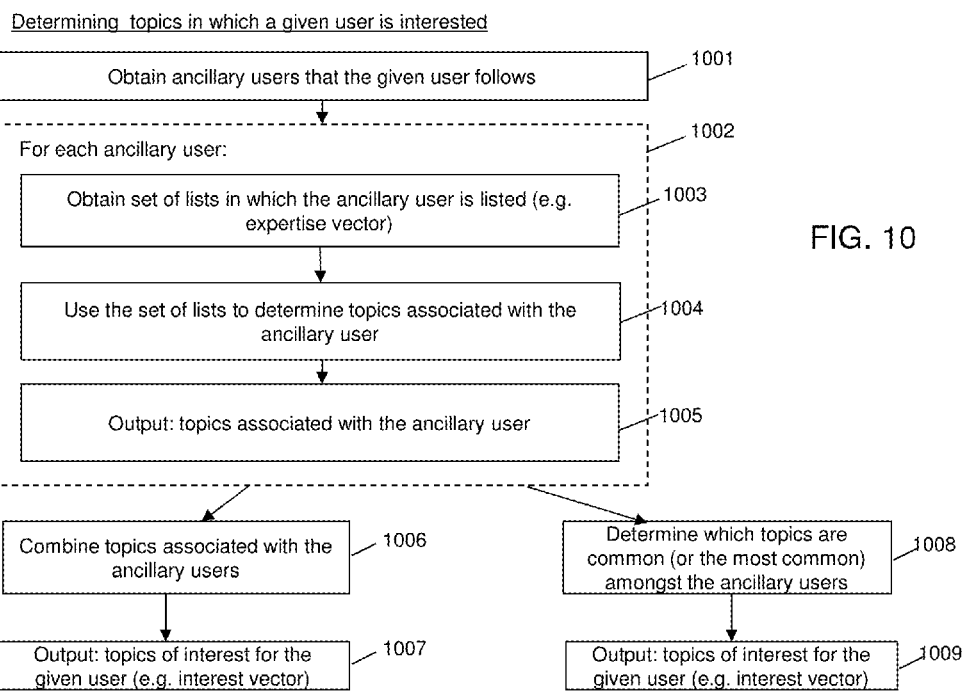
FIG. 10 is a flow diagram of an example embodiment of computer executable instructions for determining topics in which a given user is interested.

Turning to FIG. 10, an example embodiment of computer executable instructions is provided for determining topics in which a given user is interested. At block 1001, the server 100 obtains ancillary users that the given user follows.

At block 1002, a number of instructions are performed, but specific to each ancillary user. In particular, at block 1003, the server obtains a set of lists in which the ancillary user is listed (e.g. the expertise vector of the ancillary user). At block 1004, the server uses the set of lists to determine topics associated with the ancillary user. The outputs of block 1004 are topics associated with the ancillary user (block 1005). In an example embodiment, block 1002 can simply call on the algorithm presented in FIG. 9, but being applied to each ancillary user.

In an example embodiment, at block 1006, the server combines the topics from all the ancillary users. The combined topics form the output 1007 of the topics of interest for the given user (e.g. the interest vector of the given user).

In another example embodiment, an alternative to the blocks 1006 and 1007 is to determine which topics are common, or most common amongst the ancillary users (block 1008). For example, a given user Alice, follows ancillary users Bob, Celine and David. Bob is considered an expert in fishing and photography (e.g. the expertise vector of Bob). Celine is considered an expert in fishing, photography and art (e.g. the expertise vector of Celeine). David is considered an expert in fishing and music (e.g. the expertise vector of David). Therefore, since the topic of fishing is common amongst all the ancillary users, it is identified that Alice has an interest in the topic of fishing. Or, since photography is more common amongst the ancillary users (e.g. the second most common topic after fishing), then the topic of photography is also identified as a topic of interest for Alice. Since art and music are not common amongst the ancillary users, these topics are not considered to be topics interest to Alice.

In an example embodiment, module 111 implements the computer executable instructions presented in FIG. 10.

In an example embodiment, the data from the expertise vector and the data from interest vector are supplied to the Lucene algorithm for indexing.

Figure 11:
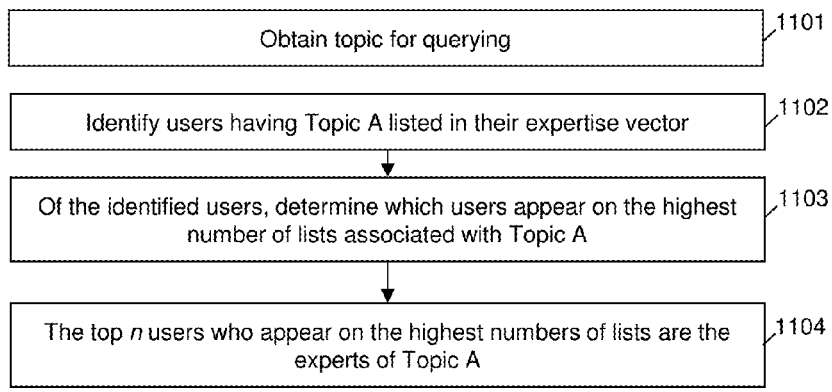
FIG. 11 is a flow diagram of an example embodiment of computer executable instructions for searching for users in the index store that are considered experts in a topic.

Turning to FIG. 11, example computer executable instructions are provided for searching for users in the index store 117 that are considered experts in a topic. At block 1101, the server obtains the topic for querying. At block 1102, the server 100 identifies users having Topic A (e.g. the topic being queried) listed in their expertise vector. At block 1103, of the identified users, the server determines which users appear on the highest number of lists associated with Topic A. At block 1104, the top n users who appear on the highest number of lists are the experts of Topic A. In other words, the server creates the set of users $U_T$ to include the top n users and their followers.

Figure 12:
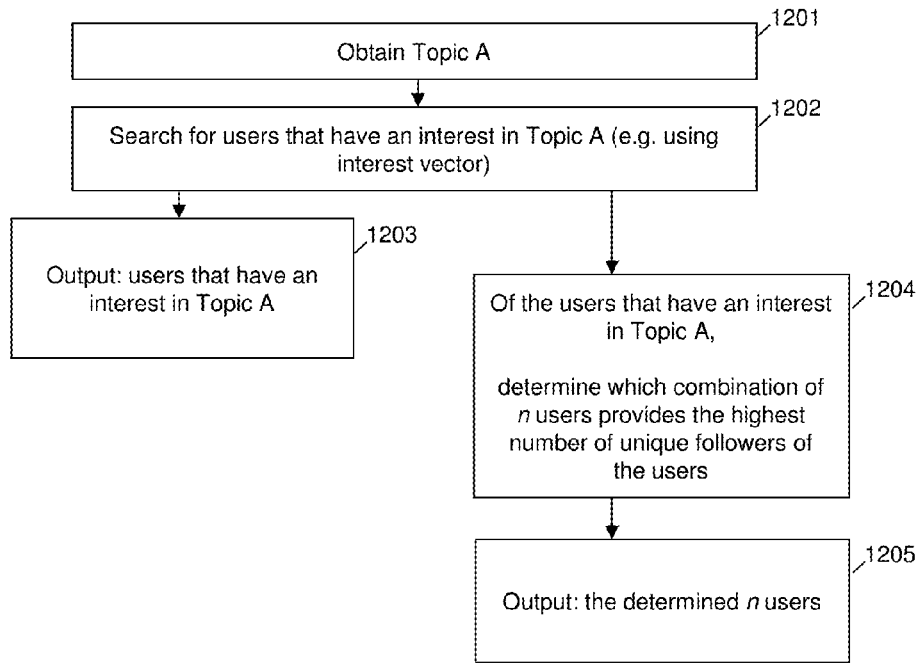
FIG. 12 is a flow diagram of an example embodiment of computer executable instructions for identifying users that have interest in a topic.

In another example embodiment for determining users, which includes the principles described in FIGS. 8 to 11, there maximum reach of followers can be used to identify the top n users. The maximum reach computation determines how many unique followers associated with a set of users (e.g. experts, influencers). For example, if a first expert and a second experts have, combined, a total of two hundred unique followers, and the second expert and a third expert have, combined, a total of three hundred unique followers, then the second expert and the third expert have a larger "reach" of followers compared to the first expert and the second expert. Turning to FIG. 12, the example computer executable instructions are for identifying users that have an interest in Topic A, which can implemented by module 114. At block 1201, the server 100 obtains Topic A, for example, through a user input in the GUI. At block 1202, the server searches for users that have an interest in Topic A (e.g. by analysing the interest vector of each user). At block 1203, the identified users from block 1202 are outputted.

To determine the maximum reach for the users that have an interest in Topic A, the server determines which combination of n users provides the highest number of unique followers of the users (block 1204). The determined top n users are outputted (block 1205) along with their followers. In other words, the users $U_T$ in the topic network include the top n users and their followers.

It will be appreciated that other known and future known ways to identify users related to a topic may be used in other example embodiments.

Identifying and Filtering Outlier Users in the Topic Network:

With respect to identifying and filtering outlier nodes (e.g. users) within the topic network, as per blocks 306 and 406, it will be appreciated that different computations can be used. Below is a non-limiting example embodiment of implementing block 306 and 406.

It is recognized that the data from the topic network can be improved by removing problematic outliers. For instance, a query using the topic "McCafe" referring to the McDonalds coffee brand also happened to bring back some users from the Philippines who are fans of a karaoke bar/cafe of the same name. Because they happen to be a tight-knit community, their influencer score is often high enough to rank in the critical top-ten list.

Figure 13:
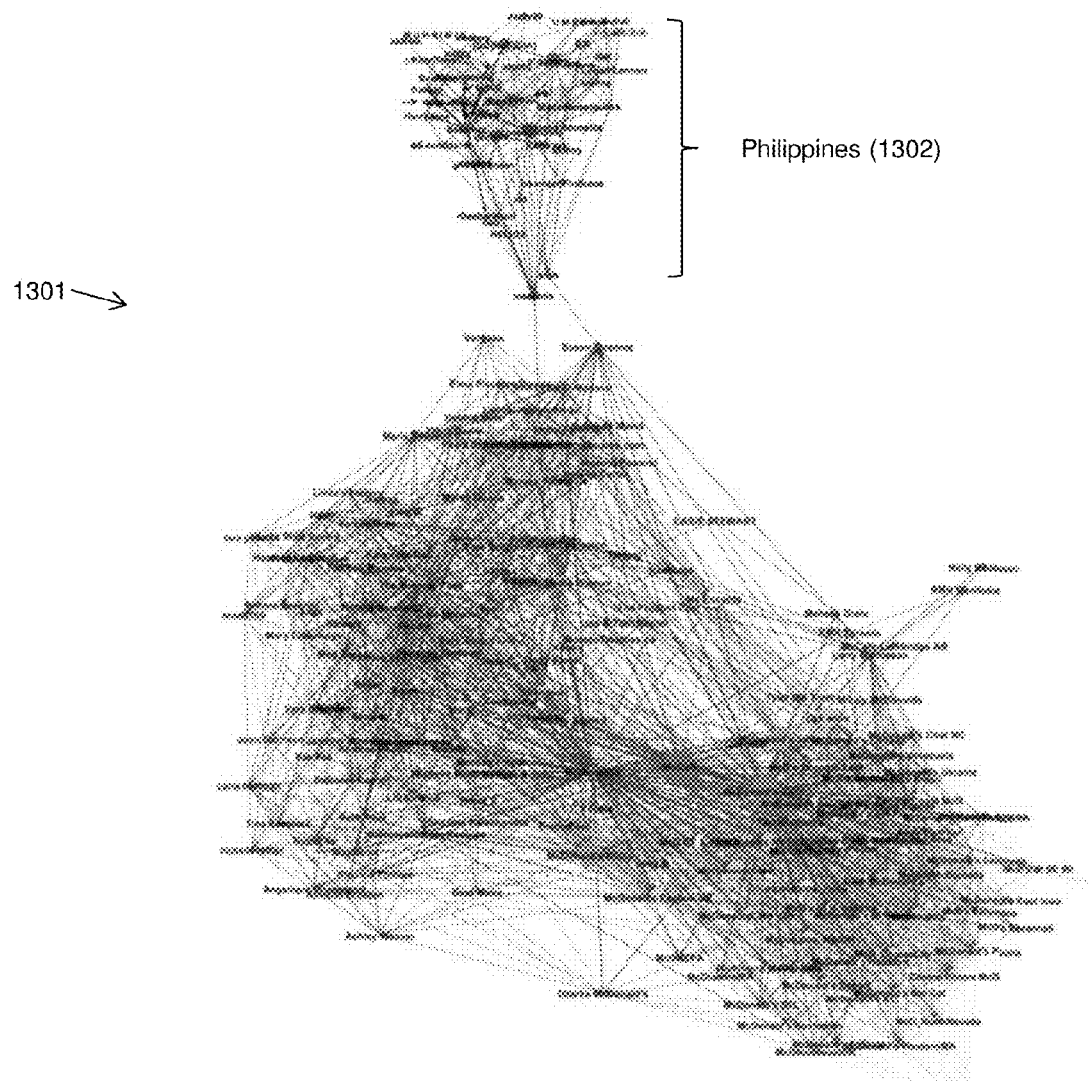
FIG. 13 is an illustration of an example topic network graph for the topic "McCafe".

Turning to FIG. 13, an illustration of an example embodiment of a topic network 1301 showing unfiltered results is shown. The nodes represent the set of users $U_T$ related to the topic McCafe. Some of the nodes 1302 or users are from the Philippines who are fans of a karaoke bar/cafe of the same name McCafe.

This phenomenon sometimes occurs in test cases, not limited to the test case of the topic McCafe. It is herein recognized that a user who looks for McCafe is not looking for both the McDonalds coffee and the Filipino karaoke bar, and thus this sub-network 1302 is considered noise.

To accomplish noise reduction, in an example embodiment, the server uses a network community detection algorithm called Modularity to identify and filter these types of outlier clusters in the topic queries. The Modularity algorithm is described in the article cited as Newman, M. E. J. (2006) "Modularity and community structure in networks," PROCEEDINGS-NATIONAL ACADEMY OF SCIENCES USA 103 (23): 8577-8696, the entire contents of which are herein incorporated by reference.

It will be appreciated that other types of clustering and community detection algorithms can be used to determine outliers in the topic network. The filtering helps to remove results that are unintended or sought after by a user looking for influencers associated with a topic.

Figure 14:
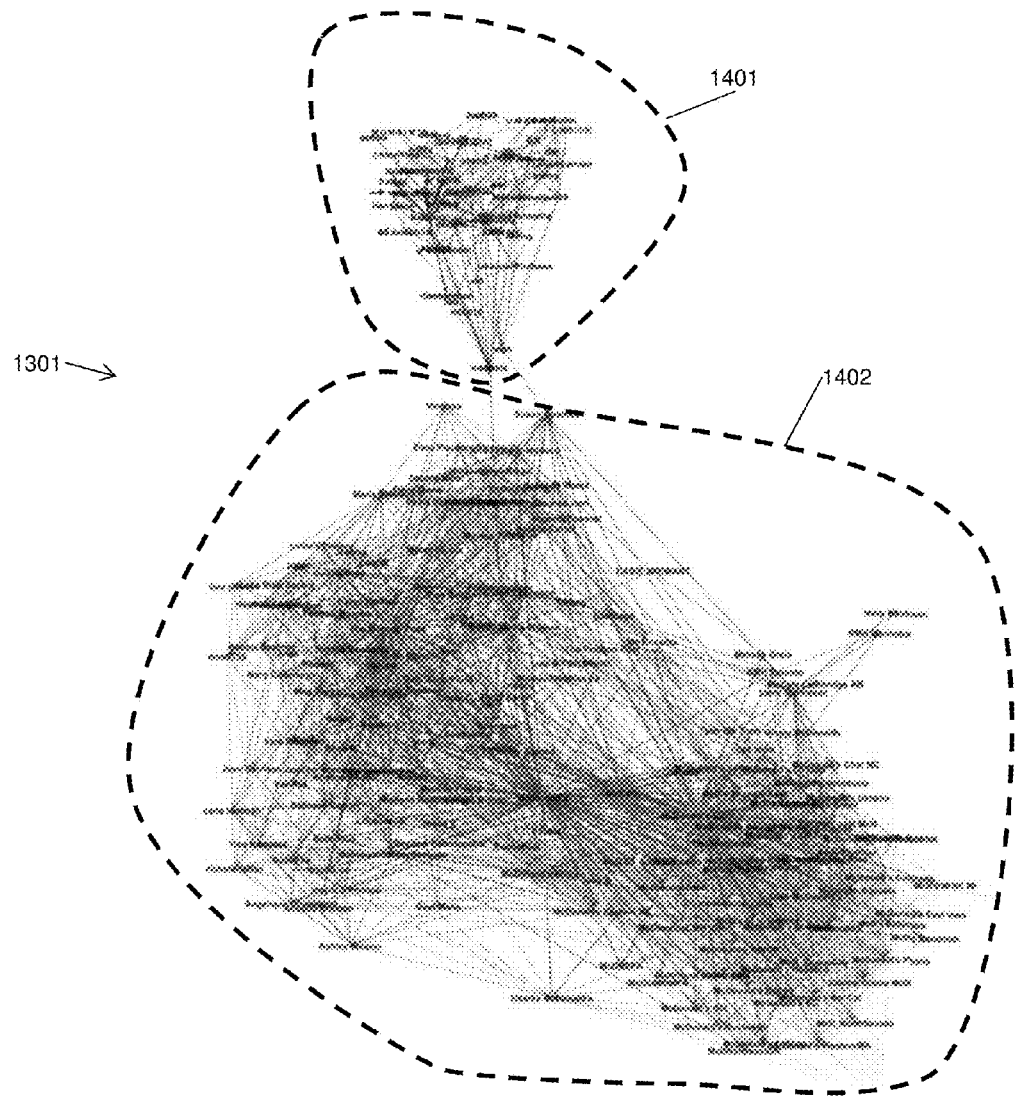
FIG. 14 is the illustration of the topic network graph in FIG. 13, showing decomposition of a main cluster and an outlier cluster.

As shown in FIG. 14, an outlier cluster 1401 is identified relative to a main cluster 1402 in the topic network 1301. The outlier cluster of users $U_O$ 1401 is removed from the topic network, and the remaining users in the main cluster 1402 are used to form the ranked list of outputted influencers.

In an example embodiment, the server 100 computes the following instructions to filter out the outliers:

1. Execute the Modularity algorithm on the topic network.
2. The Modularity function decomposes the topic network into modular communities or sub-networks, and labels each node into one of X clusters/communities. In an example embodiment, X<N/2, as a community has more than one member, and N is the number of users in the set $U_T$.
3. Sort the communities by the number of users within a community, and accept the communities with the largest populations.
4. When the cumulative sum of the node population exceeds 80% of the total, remove the remaining smallest communities from the topic network.

Figure 15:
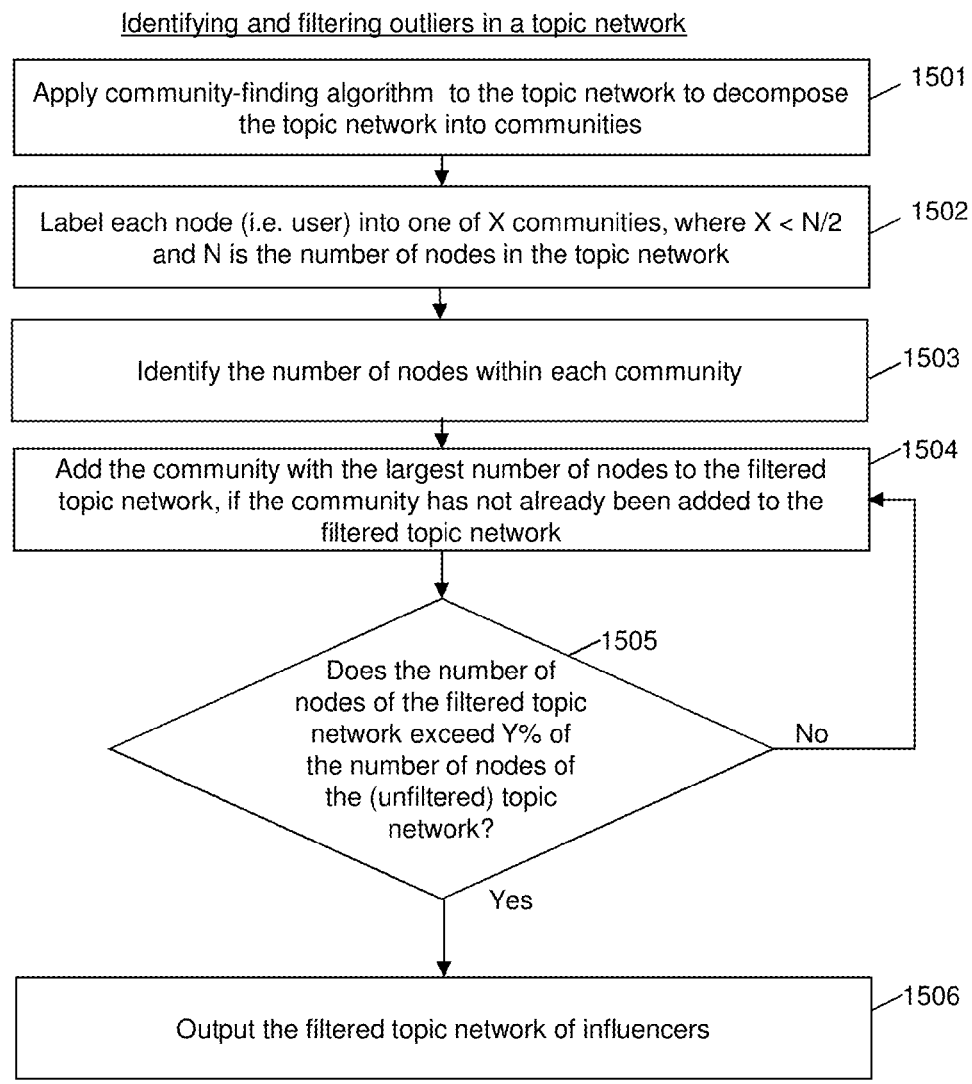
FIG. 15 is a flow diagram of an example embodiment of computer executable instructions for identifying and filtering outliers in a topic network based on decomposition of communities.

A general example embodiment of the computer executable instructions for identifying and filtering the topic network is described with respect to FIG. 15. It can be appreciated that these instructions can be used to execute blocks 306 and 406.

At block 1501, the server 100 applies a community-finding algorithm to the topic network to decompose the network into communities. Non-limiting examples of algorithms for finding communities include the Minimum-cut method, Hierarchical clustering, the Girvan-Newman algorithm, the Modularity algorithm referenced above, and Clique-based methods.

At block 1502, the server labels each node (i.e. user) into one of X communities, where X<N/2 and N is the number of nodes in the topic network.

At block 1503, the server identifies the number of nodes within each community.

The server then adds the community with the largest number of nodes to the filtered topic network, if that community has not already been added to the filtered topic network (block 1504). It can be appreciated that initially, the filtered topic network includes zero communities, and the first community added to the filtered topic network is the largest community. The same community from the unfiltered topic network cannot be added more than once to filtered topic network.

At block 1505, the server determines if the number of nodes of the filtered topic network exceeds, or is greater than, Y % of the number of nodes of the original or unfiltered topic network. In an example embodiment, Y % is 80%. Other percentage values for Y are also applicable. If not, then the process loops back to block 1504. When the condition of block 1505 is true, the process proceeds to block 1506.

Generally, when the number of nodes in the filtered topic network reaches or exceeds a majority percentage of the total number of nodes in the unfiltered topic network, then the main cluster has been identified and the remaining nodes, which are the outlier nodes (e.g. $U_O$), are also identified.

At block 1506, the filtered topic network is outputted, which does not include the outlier user $U_O$.

Example: McCafe Case Study

McCafe is a coffee-house style food and drink brand that McDonald's created. It contains a wide variety of menu items such as coffee, lattes, espressos, and smoothies. The influencer results using the systems and methods described herein for "McCafe" are shown in Table 2. The social network data comes from Twitter.

TABLE 2

The top-ranked Twitter handles ordered by influence score and Authority score for the topic query "McCafe."

| | Authority Score | PageRank |
|---|---|---|
| Twitter Users order by Influence | | |
| McCafe © | 8 | 2.255% |
| McDonald's Corp. | 10 | 1.682% |
| McDonald's Philly | 6 | 1.478% |
| Marti | 7 | 1.236% |
| McDonald's SoCal | 7 | 1.174% |
| The Mommy-Files | 8 | 1.164% |
| McDonalds Eastern NE | 6 | 1.091% |
| McDonaldsDMV | 6 | 1.017% |
| Rick Wion | 7 | 1.012% |
| McDonald's Canada | 9 | 0.960% |
| McDonald's | 10 | 0.959% |
| McDonalds NYTriState | 8 | 0.916% |
| Utah McDonald's | 6 | 0.913% |
| Me Encanta | 6 | 0.910% |
| Twitter Users order by Authority | | |
| McDonald's Corp. | 10 | 1.682% |
| McDonald's | 10 | 0.959% |
| Divine Lee | 10 | 0.558% |
| Victor Basa | 10 | 0.558% |
| Tyler Fox-Banks | 10 | 0.279% |
| McDonald's Venezuela | 10 | 0.234% |
| hashtags | 10 | 0.203% |
| GUYEL | 10 | 0.136% |
| The Product Poet | 10 | 0.107% |
| Mia Farrow | 10 | 0.074% |
| Maxene Magalona | 10 | 0.065% |
| XIAN LIM | 10 | 0.065% |
| Xeni Jardin | 10 | 0.000% |
| Manado Kota | 10 | 0.000% |

There are several observations for these results.

The influence score accurately lists the handle McCafe as the top influencer for the query, while the Authority score is 8. This does not appear on the first page of the Authority score.

Many local/regional McDonald's handles are rated highly with based on influence but had an Authority score lower than 10.

Rick Wion, with a low Authority score of 7, is the ninth highest-rated user based on influence. Rick Wion is the McDonald's VP of Social Media Engagement, who is clearly an influencer of McCafe on Twitter.

There are many inappropriate names in the Authority score list who may have mentioned McCafe and have a lot of followers, but they are clearly not influencers.

The above observations demonstrate the better quality of the influencer results when using the systems and methods described herein.

Example: Fanexpo Case Study

Fanexpo is an annual convention of comics, sci-fi and fantasy entertainment held in the city of Toronto, Canada. The top-ranked influencers for the topic query "Fanexpo" are shown on the left in Table 3, with comparison results based on Authority score shown on the right. The influencers are determined using the systems and methods described herein.

TABLE 3

The top-ranked Twitter handles ordered by influence score and Authority score for the topic query "Fanexpo."

| | Authority Score | PageRank |
|---|---|---|
| Twitter Users order by influence | | |
| Fan Expo Canada | 8 | 1.241% |
| C. B. Cebulski | 9 | 0.966% |
| Silver Snail | 7 | 0.822% |
| SpaceChannel | 8 | 0.790% |
| Torontoist | 10 | 0.778% |
| Dark Horse Comics | 10 | 0.749% |
| Mark Brooks | 8 | 0.671% |
| Michael Shanks | 9 | 0.661% |
| Katie Cook | 8 | 0.659% |
| Kelly Sue DeConnick | 8 | 0.637% |
| Ramon Perez | 7 | 0.632% |
| Shaun Hatton | 7 | 0.627% |
| Fearless Fred | 9 | 0.614% |
| Alice Quinn | 7 | 0.583% |
| Twitter Users order by Authority | | |
| Dark Horse Comics | 10 | 0.749% |
| Torontoist | 10 | 0.778% |
| Michael Rooker | 10 | 0.580% |
| Amanda Tapping | 10 | 0.563% |
| National Post | 10 | 0.432% |
| CTV Toronto | 10 | 0.322% |
| CBC Top Stories | 10 | 0.310% |
| Nathan Fillion | 10 | 0.358% |
| Brent Spiner | 10 | 0.350% |
| Jessica Nigri | 10 | 0.338% |
| Meg Turney | 10 | 0.132% |
| The Walking Dead | 10 | 0.215% |
| Eduardo Benvenuti | 10 | 0.119% |
| Randy Pitchford | 10 | 0.118% |

Several interesting observations can be seen when analyzing these results.

The influencer approach described herein accurately lists the handle Fan Expo Canada as the top influencer for the query, while the Authority approach gave it a score of 8.

The second-ranked influencer, C. B. Cebulski, is a famous writer for Marvel comics, who is considered very influential in this domain.

Notice in the top Authority rank, the above two influencers (i.e. Fan Expo Canada and C. B. Cebulski) do not appear in the critical first page.

The next four influencers, Silver Snail, SpaceChannel, Torontoist, and Dark Horse Comics, are a comics store in Toronto, a sci-fi TV channel, a Toronto entertainment blog and a comic publisher.

The top Authority ranks general news outlets National Post, CTV Toronto, CBC Top Stories, which are user accounts that are not appropriate for this topic.

The next series of influencers (e.g. Twitter account names) are either writers for Marvel or DC comics, or actors in sci-fi or fantasy film or a TV series. Notice that many of them have an Authority score of less than 10.

Again, the above observations demonstrate the better quality of the influencer results when using the systems and methods described herein.

Example: Nike Livestrong Case Study

Livestrong is an organization founded by now-disgraced cyclist Lance Armstrong to benefit cancer research. Nike recently cut relations with Livestrong after Armstrong was indicted on a doping scandal. The influencer results for the query "Nike Livestrong" are shown on the right in Table 4, using social network data from Twitter. The results using an Authority approach are shown on the right.

TABLE 4

The top-ranked Twitter handles ordered by innfluence score and Authority score for the topic query "Nike Livestrong."

| | Authority Score | PageRank |
|---|---|---|
| Twitter Users order by influence | | |
| Darren Rovell | 10 | 0.63% |
| The Associated Press | 10 | 0.45% |
| Juliet Macur | 8 | 0.40% |
| Deadspin | 10 | 0.37% |
| Nice Kicks | 10 | 0.37% |
| Joseph Weisenthal | 9 | 0.34% |
| Jim Roberts | 10 | 0.34% |
| Bloomberg News | 10 | 0.34% |
| NBC Nightly News | 10 | 0.32% |
| Sports Illustrated | 10 | 0.32% |
| NYT Sports | 9 | 0.29% |
| Business Insider | 10 | 0.29% |
| CBSSports.com | 10 | 0.28% |
| Twitter Users order by Authority | | |
| Darren Rovell | 10 | 0.63% |
| The Associated Press | 10 | 0.45% |
| Nice Kicks | 10 | 0.37% |
| Deadspin | 10 | 0.37% |
| NBC Nightly News | 10 | 0.32% |
| Jim Roberts | 10 | 0.34% |
| Bloomberg News | 10 | 0.34% |
| Sports Illustrated | 10 | 0.32% |
| Business Insider | 10 | 0.29% |
| CBSSports.com | 10 | 0.28% |
| Complex | 10 | 0.26% |
| Cyclingnews.com | 10 | 0.25% |
| Fast Company | 10 | 0.20% |

There are several interesting points from Table 4.

Many of the top influencers with Authority score 10 are sports news handles or sports journalists who wrote extensively on the Armstrong doping scandal.

In particular, Juliet Macur is third-ranked based on influence, while her Authority score is 8. She is a New York Times sports journalist who wrote the book "Cycle of Lies: the Fall of Lance Armstrong."

Joseph Weisenthal is a sports business insider who tweeted about the doping scandal on the Nike Livestrong partnership.

While it may be difficult to distinguish between all the Twitter user accounts with an Authority score of 10, the influence ranking gives more specificity to the relative rank of the influencers.

Further details of the method steps described in FIG. 3 and FIG. 4 as particular related to identification of communities, identification of popular characteristics and their values within each community, and display of the results is described below.

Identifying Communities

Figure 16:
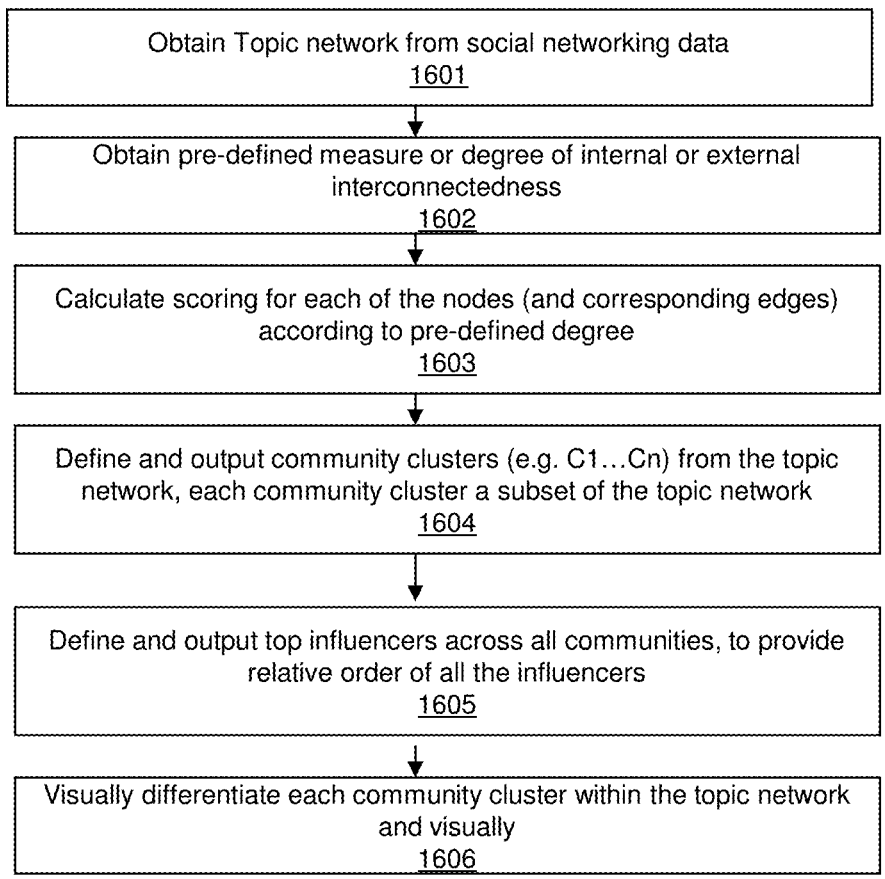
FIG. 16 is a flow diagram of example embodiment of computer executable instructions for identifying and providing community clusters from each topic network.

Turning to FIG. 16, an example embodiment of computer executable instructions are shown for identifying communities from social network data.

A feature of social network platforms is that users are following (or defining as a friend) another user. As described earlier, other types of relationships or interconnectedness can exist between users as illustrated by a plurality of nodes and edges within a topic network. Within the topic network, influencers can affect different clusters of users to varying degrees. That is, based on the process for identifying communities as described in relation to FIG. 16, the server is configured to identify a plurality of clusters within a single topic network, referred to as communities. Since influence is not uniform across a social network platform, the community identification process defined in relation to FIG. 16 is advantageous as it identifies the degree or depth of influence of each influencer (e.g. by associating with one community over another) across the topic network.

As will be defined in FIG. 16, the server is configured to provide a set of distinct communities (e.g. C1, . . . , Cn), and the top influencer(s) in each of the communities. In yet a preferred aspect, the server is configured to provide an aggregated list of the top influencers across all communities to provide the relative order of all the influencers.

At step 1601, the server is configured to obtain topic network graph information from social networking data as described earlier (e.g. FIG. 3-FIG. 4). The topic network visually illustrates relationships among the nodes a set of users ($U_T$) each represented as a node in the topic network graph and connected by edges to indicate a relationship (e.g. friend or follower-followee, or other social media interconnectivity) between two users within the topic network graph. At block 1602, the server obtains a pre-defined degree or measure of internal and/or external interconnectedness (e.g. resolution) for use in defining the boundary between communities.

At block 1603, the server is configured to calculate scoring for each of the nodes (e.g. influencers) and edges according to the pre-defined degree of interconnectedness (e.g. resolution). That is, in one example, each user handle is assigned a Modularity class identifier (Mod ID) and a PageRank score (defining a degree of influence). In one aspect, the resolution parameter is configured to control the density and the number of communities identified. In a preferred aspect, a default resolution value of 2 which provides 2 to 10 communities is utilized by the server. In yet another aspect, the resolution value is user defined (e.g. via computing device 101 in FIG. 2) to generate higher or lower granularity of communities as desired for visualization of the community information.

At block 1604, the server is configured to define and output distinct community clusters (e.g. $C_1, C_2, \ldots, C_n$) thereby partitioning the users $U_T$ into $U_{C1} \ldots U_{Cn}$ such that each user defined by a node in the network is mapped to a respective community. In one aspect, modularity analysis is used to define the communities such that each community has dense connections (high connectivity) between the cluster of nodes within the community but sparse connections with nodes in different communities (low connectivity). In one aspect, the community detection process steps 1603-1606 can be implemented utilizing a modularity algorithm and/or a density algorithm (which measures internal connectivity). Furthermore, visualization of the results is implemented utilizing Gephi, an open source graph analysis package, and/or a javascript library in one aspect.

At block 1605, the server is configured to define and output top influencer across all communities and/or top influencers within each community and provide relative ordering of all influencers. In one aspect, the top influencers are visually displayed alongside their community when a particular community is selected. In yet a further aspect, at block 1605, the server is configured to provide an aggregated list of all the top influencers across all communities to provide the relative order of all the influencers.

At block 1606, the server is configured to visually depict and differentiate each community cluster (e.g. by colour coding or other visual identification to differentiate one community from another). In a further aspect, at block 1606, the server is configured to provide a set of top influencers in each of the communities visually linked to the respective community. In yet a further aspect, the server at block 1606, the server is configured to vary the size of each node of the community graph to correspond to the score of the respective influencer (e.g. score of influence). As output from block 1606, the edges from the nodes show connections between each of the users, within their community and across other communities.

Accordingly, as will be shown in FIGS. 19A-19C and 20A-20B the visualization of the communities and the influencers (e.g. the top influencers ranked within each communities and/or a listing of top influencers across all communities) allow an end user (e.g. a user of computing device 101 in FIG. 2) to visualize the scale and relative significance of each of the influencers in their associated communities.

Identifying Popular Characteristics within a Given Community

As described in relation to FIGS. 3 and 4, in yet a further aspect, the server is configured to determine, for each given community (e.g. $C_1$) provided by block 1603, popular characteristic values for pre-defined characteristics (e.g. common keywords and phrases, topics of conversations, common locations, common images, common meta data) associated with users (e.g. $U_{C1}$) within the given community (e.g. $C_1$), based on their social network data. Accordingly, trends or commonalities by examining the pre-defined set of characteristics (e.g. topics of conversation) for users $U_{C1}$ within each community $C_1$ can be defined. In one aspect, the top listing of characteristic values (e.g. top topics of conversation among all users within each community) is depicted at block 1605 and output to the computing device 101 (shown in FIG. 2) for display in association with each community.

Displaying Communities and Popular Characteristics

Referring to FIGS. 17A-17D shown are screen shots as provided from GUI module 106 of the server and output to display screen 125 of computing device (FIG. 2) for visualization of the community clusters from a topic network and visualization of the popular characteristics in each community. As shown in FIGS. 17A-17D, the server provides an interactive interface for selecting communities and/or nodes within the topic network/particular community for visually revealing details about each node (e.g. user, community information and degree of influence). Accordingly, FIGS. 17A-17D illustrate the interactive visualization of the Influencer Communities and their characteristic (e.g. conversations for each community in a WordCloud visualization technique). As also shown in FIGS. 17A-17D, each community (e.g. consisting of edges and nodes) is visually differentiated from another community (e.g. by colour coding) and each node is sized according to degree of influence within the entire topic network. Furthermore, by selecting a particular community (e.g. visual selection using a mouse or pointer of the community from the topic network), the community values are then depicted (e.g. highlighting the community within the topic network graph, revealing the top influencers within the community, and revealing popular characteristic values for top topics of conversation for the selected community). In FIGS. 17A-17D, the visualization of the popular characteristic values on the display screen (e.g. screen of computing device 101 in FIG. 2) is shown as a word cloud which depicts top conversation topics within the selected community as well as an indication of the frequency of use of each topic within all users of the particular community.

Figure 17A:
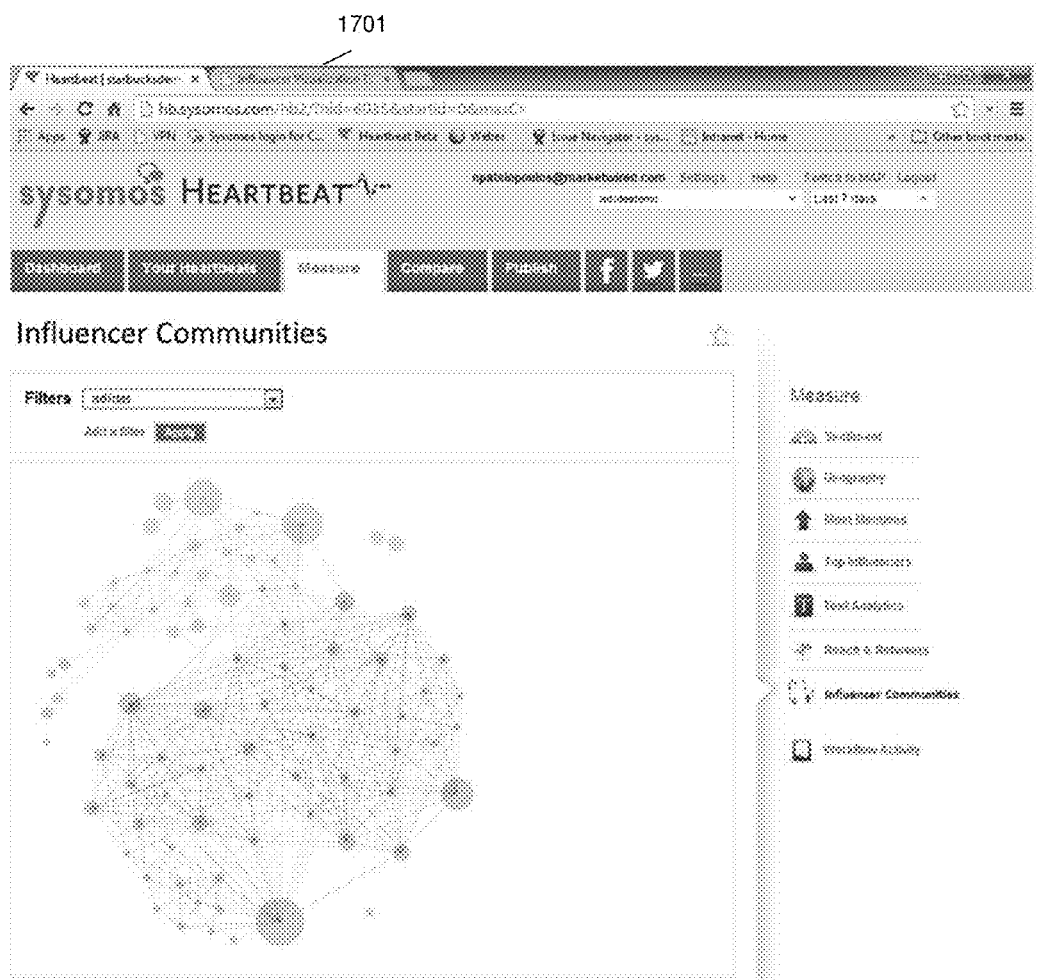
FIGS. 17A-17D illustrate exemplary screen shots for interacting with a GUI displaying the influencer communities within a topic network.

Referring to FIG. 17A, shown is a screen 1701 (e.g. of computing device 101 in FIG. 2), illustrating that within a topic search (e.g. search for term "adidas", there are multiple conversations occurring in several communities (clusters, segments) of a social network.

Figure 18:
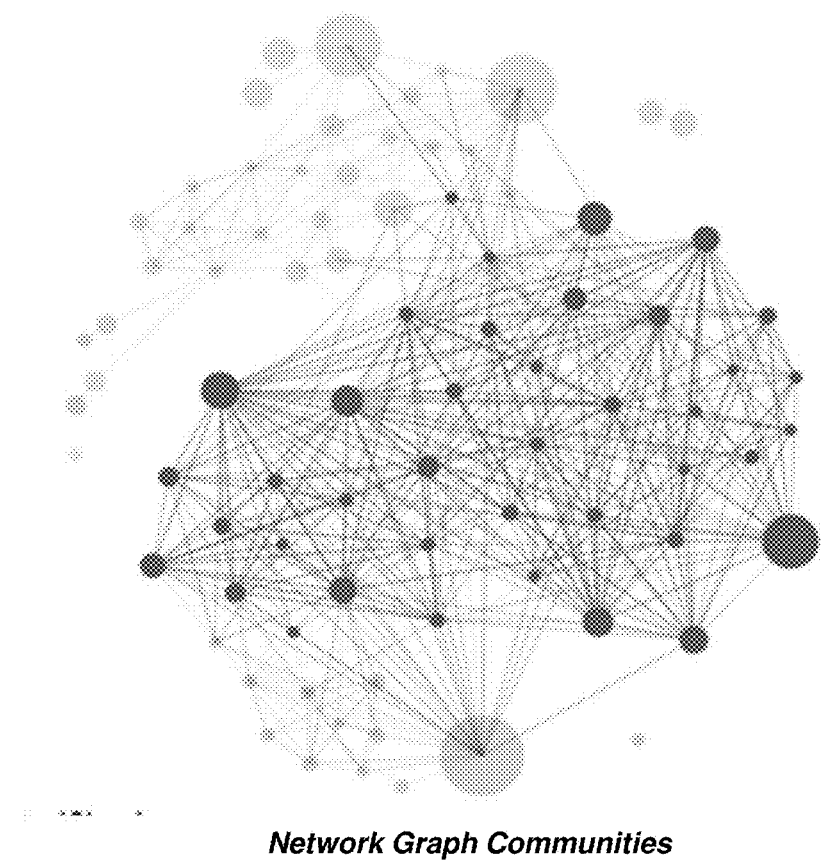
FIG. 18 illustrates an exemplary community network graph.

Referring to FIG. 18, shown is a screen illustrating that within another topic search, the topic network has a plurality of community clusters each visually differentiated from one another and the nodes sized to reflect the degree of influence, preferably within the entire topic network.

Figure 17B:
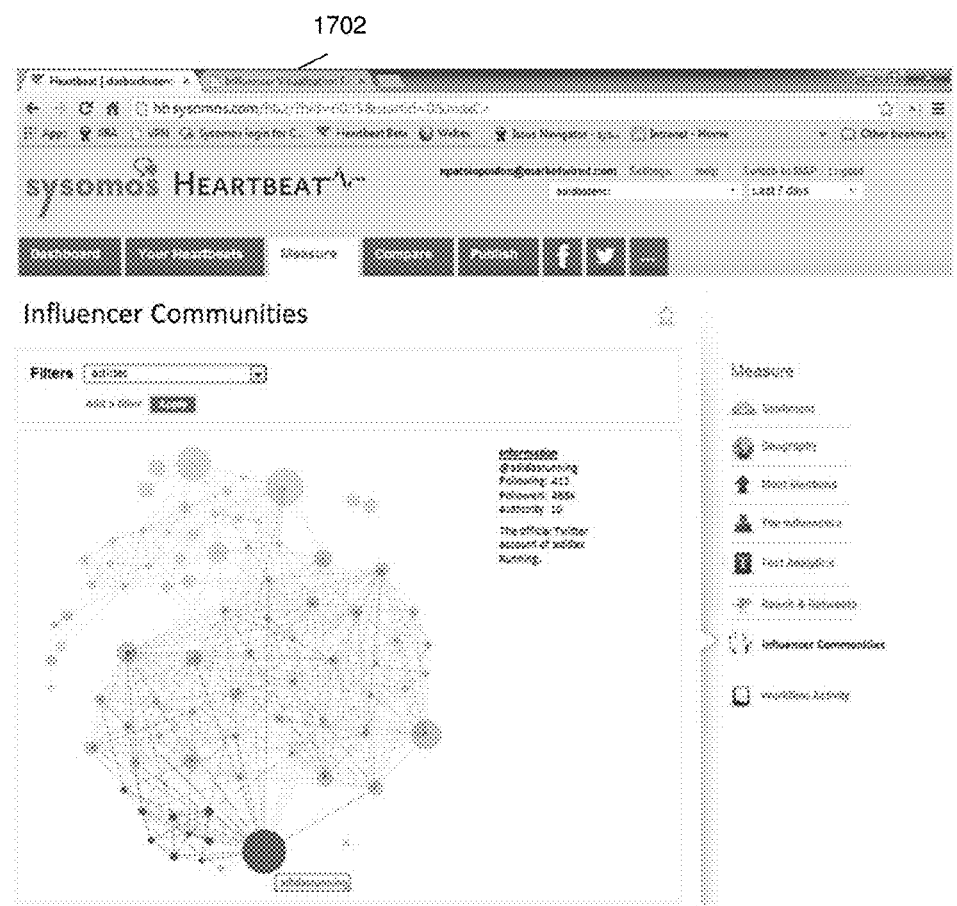

Referring to FIG. 17B, shown is a screen 1702 which depicts that the nodes are color coded to visually associate them with their respective community and the size of each node is proportional to the Influencer score in their community (color coded) relative to the overall topic network. FIG. 17B further illustrates that by selecting a node (e.g. hovering the mouse pointer over a node), the Twitter handle (e.g. adidasrunning) pops up and the information for that handle is displayed is displayed on screen 1702 (e.g. in the right hand list under Information).

Figure 17C:
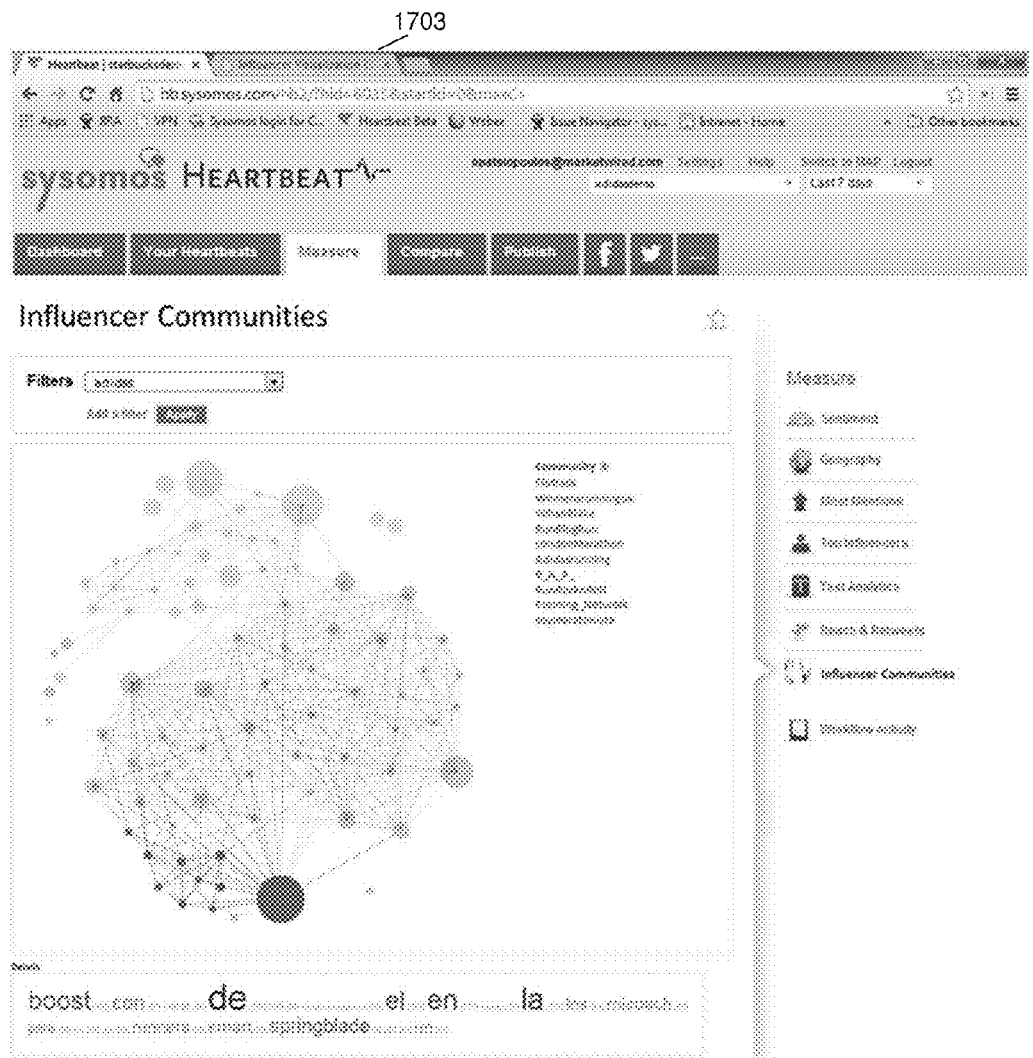

Referring to FIG. 17C, shown is a screen 1703, and choosing a sub-graph visually highlights the top Influencers in that selected community, and gives a visual representation on the screen 1703 (e.g. wordcloud of the conversations in that community). As illustrated in FIG. 17, insight into community behavior; positive/negative sentiment is shown.

Figure 17D:
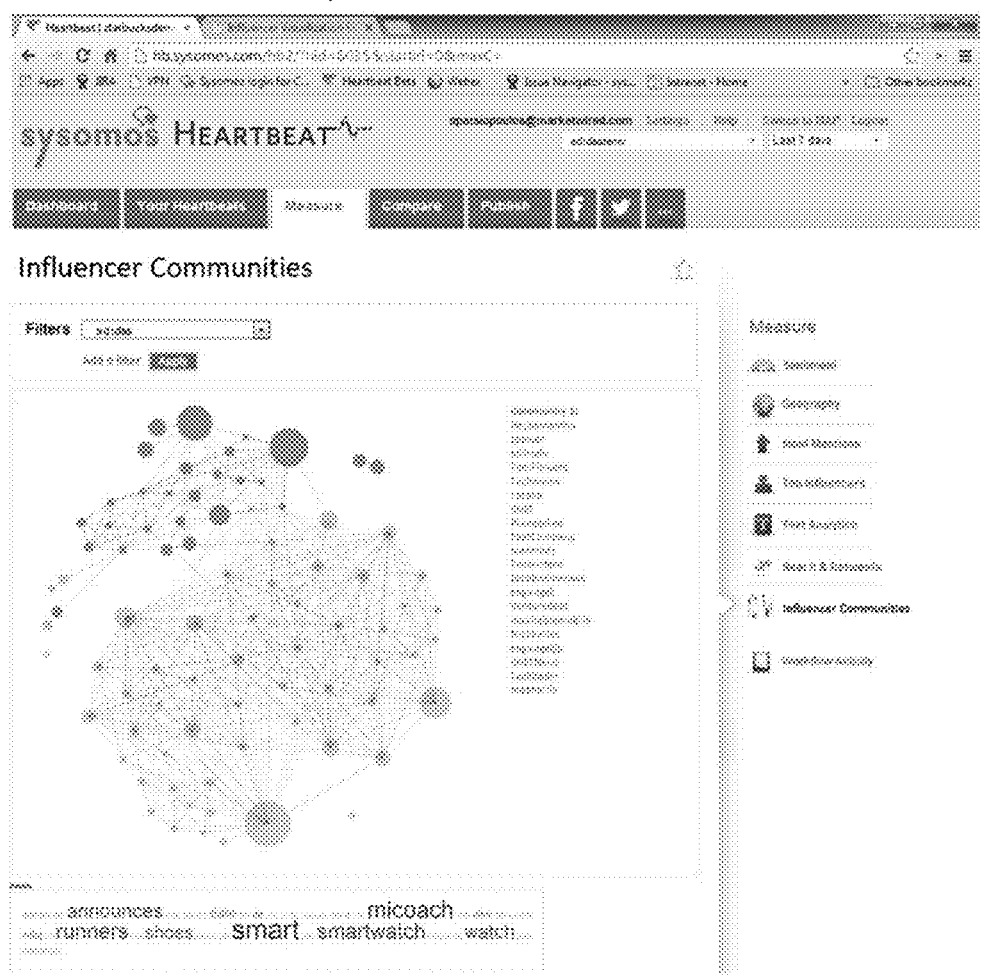

Referring to FIG. 17D shown is a screen 1704, where a community (e.g. community 1) is selected (e.g. by user input selection via computing device 101 of FIG. 2) and the top influencers within the community are visually depicted alongside the topic network that is highlighted to show the selected community. FIG. 17D shows exemplary use of advanced network analysis for community detection (e.g. Modularity), and influence (using PageRank). The approach in FIG. 17A-17D is advantageous as it allows large scale processing of social networking data (e.g. full Twitter, Firehose) rather than sampling the social network data as that would miss small but potentially significant communities of influencers.

Defining Popular Characteristics (e.g. Conversation Topics) within a Community

Referring to FIGS. 19A-19C and 20A-20B, shown are exemplary screen shots of various influencer communities within two different topic networks (e.g. Adidas and Dove respectively). As illustrated in these figures, while the identities of user handles in each community can give some insight into the demographics of the community, it is desirable to show a more concrete description of the community. Accordingly, in one aspect (e.g. example implementation of FIGS. 3 & 4), the sample of tweets returned from the topic search query is identified and a frequency count is generated on the relevant terms to generate a word cloud of the popular terms in the conversations of each community. With this visualization, one can thus easily visually identify the behavioural characteristics of each community and use this information to make a more targeted message to the influencers in each community.

FIGS. 19A-19C and 20A-20B illustrate an example implementation for determining and visualizing the community clusters within atopic network and the associated popular characteristic values for each community (e.g. example implementation of FIG. 3 or 4). In accordance with one implementation, FIGS. 19A-19C and 20A-20B utilize the underlying Twitter data obtained from the Sysomos system, which is formed by a user defined list of Boolean keyword search terms over a specified period of time in one example implementation.

Example: Adidas Running Case Study—FIGS. 19A-19C

Figure 19A:
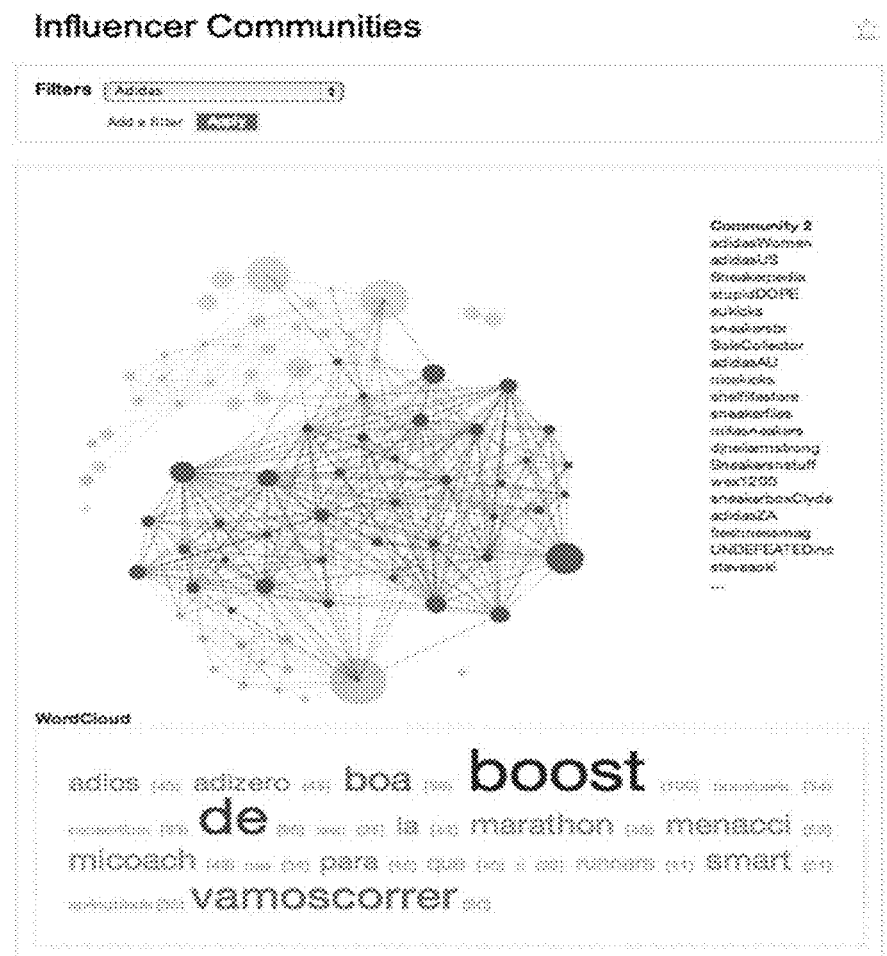
FIGS. 19A-19C show exemplary communities and characteristics for a particular topic.
Figure 19B:
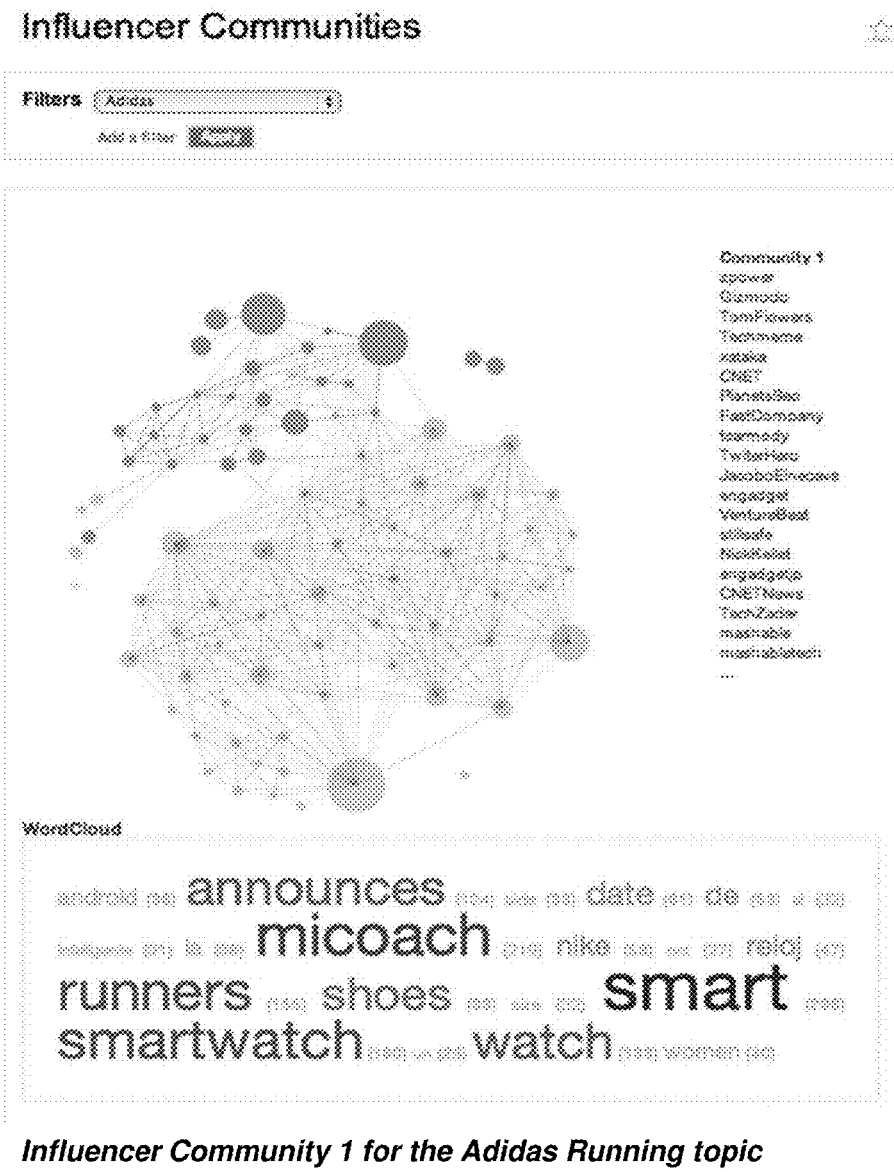
Figure 19C:

The darker shaded groups in FIGS. 19A-19C respectively, correspond to the three largest Communities in the "Adidas Running" topic. The highlighted community (blue) in FIG. 19A corresponds to the largest set of influencers.

As can be seen from FIG. 19A, the word cloud and the user handles illustrate that the conversation in this community appears to be around Adidas sneakers and shoes.

In FIG. 19B, the second largest community (orange), has conversations around the Adidas Micoach smartwatch for training. There are also many gadget review handles in this community such as Engadget, CNET, Mashable, FastCompany, and Gizmodo.

In FIG. 19C, the main AdidasRunning handle is part of this smaller community (green), with serious running handles such as YohanBlake, RunBlogRun, LondonMarathon, B_A_A (Boston Athletic Association), RunningNetwork, etc.

Upon a review of the visualization screens for the communities and their characteristics in FIGS. 19A-19C, it can be seen that AdidasRunning may be well connected to the serious running community (green), but is not well connected to the larger influencer communities of sneaker aficionados (blue) and the gadget review (orange) communities. Accordingly, it can be determined that for effective influencer marketing, AdidasRunning should connect with the key influencers in the other communities and that their messages could be tailored to the other communities such as to have better overlap and connection with the other communities.

Example: Dove Case Study

Figure 20A:
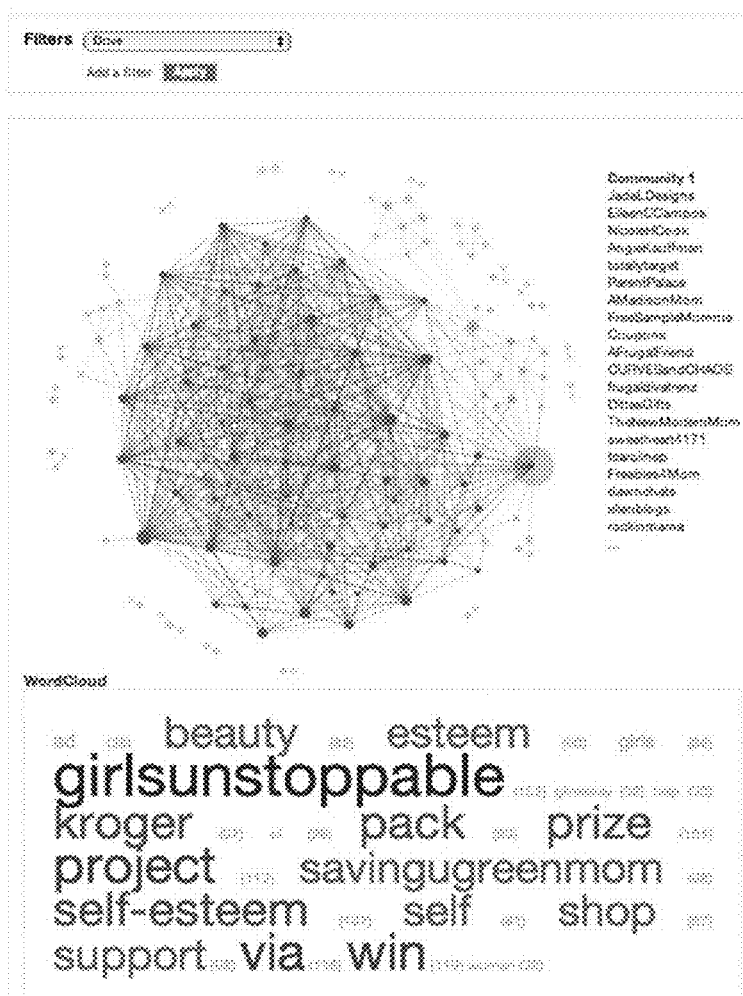
FIGS. 20A-20B show exemplary communities and characteristics for a second selected topic.
Figure 20B:
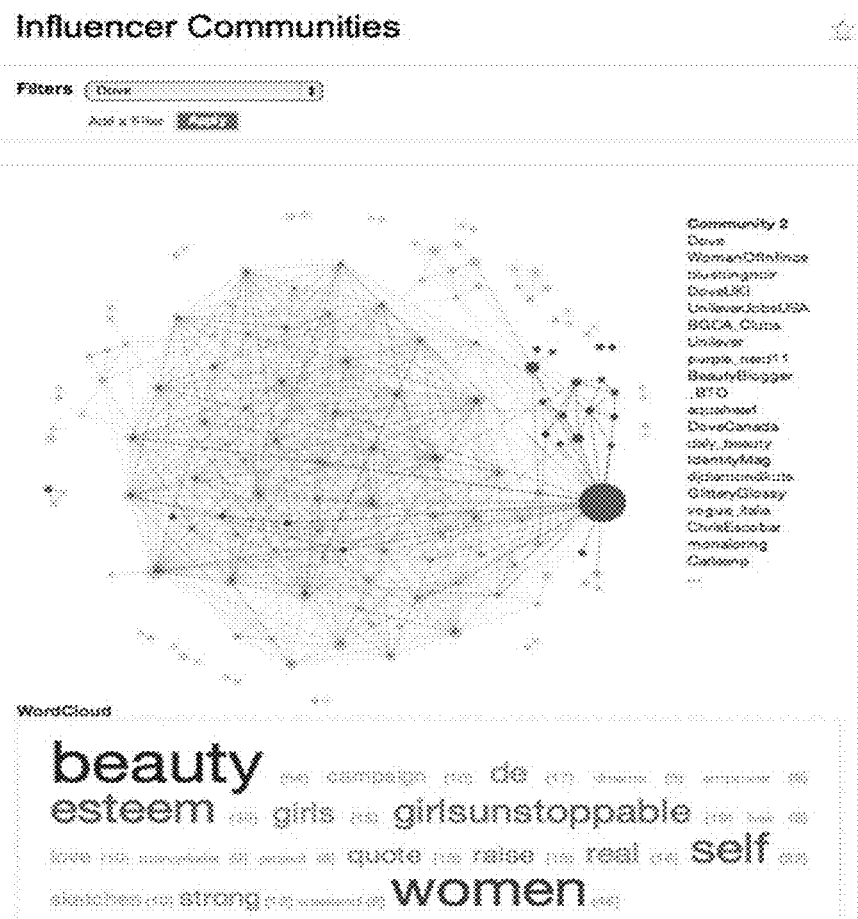

FIGS. 20A and 20B show the two largest communities in the Dove (soap) product topic in darker shading. FIG. 20A has the largest community (blue) of relatively low influencers. As can be visually revealed from the user handles and the word cloud of FIGS. 20A and 20B, the user handles and word could reflect that the users of influence/topics of influence seem to be the "mommy bloggers" interested in saving, shopping, win, prize, Kroger (supermarket).

As well, Dove's "girlsunstoppable" campaign has influence within this community.

FIG. 20B depicts a smaller community which has the official Dove corporate handles (DoveCanada, DoveUK, Unilever, etc.) as well as some semi-influential beauty bloggers.

Therefore upon a review of FIGS. 20A and 20B, it can be visually revealed that that while Dove (as a Topic query) is well connected among influential beauty bloggers, there can be a stronger connection with the mommy bloggers as they are the larger community as compared to the beauty bloggers. Again, one can tailor the message differently to the influencers in this community without alienating the others.

Thus as discussed in reference to the figures (e.g. FIGS. 2, 3-4, 16-20*b*), there is presented a system and method for identifying influencers within their social communities (based on obtained social networking data) for a given query topic. It can also be seen that influencers do not have uniform characteristics, and there are in fact communities of influencers even within a given topic network. The systems and methods presented herein are utilized to output visualization on the computing device (e.g. computing device 101) visualized in a network graph to display the relative influencer of entities or individuals and their respective communities. Additionally popular characteristic values (e.g. based on pre-defined characteristic such as topics of conversation) are visually depicted on the display screen of the computing device for each community showing the top or relevant topics. The topics can be depicted as word clouds of each community's conversation to visually reveal the behavioural characteristics of the individual communities.

General examples of the methods and systems are provided below.

In an example embodiment, a method is provided that is performed by a server for determining one or more users who are influential for a topic. The method includes: obtaining a topic; determining users within a social data network that are related to the topic; modeling each of the users as a node and determining relationships between each of the users; computing a topic network graph using the users as nodes and the relationships as edges; ranking the users within the topic network graph; identifying and filtering outlier nodes within the topic network graph; and outputting users remaining within the topic network graph according to their associated rank.

In an example aspect, the users that at least one of consume and generate content comprising the topic are considered the users related to the topic.

In another example aspect, in the topic network graph, an edge defined between at least two users represents a friend connection between the at least two users.

In another example aspect, in the topic network graph, an edge defined between at least two users represents a follower-followee connection between the at least two users, and wherein one of the at least two users is a follower and the other of the least two users is a followee.

In another example aspect, in the topic network graph, an edge defined between at least two users represents a reply connection between the at least two users, and wherein one of the at least two users replies to a posting made by the other of the at least two users.

In another example aspect, in the topic network graph, an edge defined between at least two users represents a re-post connection between the at least two users, and wherein one of the at least two users re-posts a posting made by the other of the at least two users.

In another example aspect, the ranking includes using a PageRank algorithm to measure importance of a given user within the topic network graph.

In another example aspect, the ranking includes using at least one of: Eigenvector Centrality, Weighted Degree, Betweenness, and Hub and Authority metrics.

In another example aspect, identifying and filtering the outlier nodes within the topic network graph includes: applying at least one of a clustering algorithm, a modularity algorithm and a community detection algorithm on the topic network graph to output multiple communities; sorting the multiple communities by a number of users within each of the multiple communities; selecting a number n of the communities with the largest number of users, wherein a cumulative sum of the users in the n number of the communities at least meets a percentage threshold of a total number of users in the topic network graph; and establishing users in unselected communities as the outlier nodes.

In another example embodiment, a computing system is provided for determining one or more users who are influential for a topic. The computing system includes: a communication device; memory; and a processor. The processor is configured to at least: obtain a topic; determine users within a social data network that are related to the topic; model each of the users as a node and determining relationships between each of the users; compute a topic network graph using the users as nodes and the relationships as edges; rank the users within the topic network graph; identify and filter outlier nodes within the topic network graph; and output users remaining within the topic network graph according to their associated rank.

It will be appreciated that different features of the example embodiments of the system and methods, as described herein, may be combined with each other in different ways. In other words, different modules, operations and components may be used together according to other example embodiments, although not specifically stated.

The steps or operations in the flow diagrams described herein are just for example. There may be many variations to these steps or operations without departing from the spirit of the invention or inventions. For instance, the steps may be performed in a differing order, or steps may be added, deleted, or modified.

The GUIs and screen shots described herein are just for example. There may be variations to the graphical and interactive elements without departing from the spirit of the invention or inventions. For example, such elements can be positioned in different places, or added, deleted, or modified.

Although the above has been described with reference to certain specific embodiments, various modifications thereof will be apparent to those skilled in the art without departing from the scope of the claims appended hereto.

The invention claimed is:

1. A method performed by a server for determining one or more users who are influential for a topic, comprising:
   obtaining a topic;
   determining users within a social data network that are related to the topic;
   modeling each of the users as a node and determining relationships between each of the users;
   computing a topic network graph using the users as nodes and the relationships as edges;
   ranking the users within the topic network graph;
   identifying and filtering outlier nodes within the topic network graph;
   outputting users remaining within the topic network graph according to their associated rank; and
   wherein the identifying and filtering the outlier nodes within the topic network graph comprises: computing multiple communities based on the topic network graph; sorting the multiple communities by a number of users within each of the multiple communities; selecting a number n of the communities with the largest number of users, wherein a cumulative sum of the users in the n number of the communities at least meets a percentage threshold of a total number of users in the topic network graph; and establishing users in unselected communities as the outlier nodes.

2. The method of claim 1 wherein the users that at least one of consume and generate content comprising the topic are considered the users related to the topic.

3. The method of claim 1 wherein, in the topic network graph, an edge defined between at least two users represents a friend connection between the at least two users.

4. The method of claim 1 wherein, in the topic network graph, an edge defined between at least two users represents a follower-followee connection between the at least two users, and wherein one of the at least two users is a follower and the other of the least two users is a followee.

5. The method of claim 1 wherein, in the topic network graph, an edge defined between at least two users represents a reply connection between the at least two users, and wherein one of the at least two users replies to a posting made by the other of the at least two users.

6. The method of claim 1 wherein, in the topic network graph, an edge defined between at least two users represents a re-post connection between the at least two users, and wherein one of the at least two users re-posts a posting made by the other of the at least two users.

7. The method of claim 1 wherein the ranking comprises using a PageRank algorithm to measure importance of a given user within the topic network graph.

8. The method of claim 1 wherein the ranking comprises using at least one of: Eigenvector Centrality, Weighted Degree, Betweenness, and Hub and Authority metrics.

9. The method of claim 1 wherein the computing of the multiple communities comprises applying at least one of a clustering algorithm, a modularity algorithm and a community detection algorithm on the topic network graph.

10. A non-transitory computer readable medium comprising executable instructions that, when executed, perform the method of claim 1.

11. A computing system for determining one or more users who are influential for a topic, comprising:
   a communication device;
   memory; and
   a processor configured to at least:
   obtain a topic;
   determine users within a social data network that are related to the topic;
   model each of the users as a node and determining relationships between each of the users;
   compute a topic network graph using the users as nodes and the relationships as edges;
   rank the users within the topic network graph;
   identify and filter outlier nodes within the topic network graph;
   output users remaining within the topic network graph according to their associated rank; and
   wherein the identifying and filtering the outlier nodes within the topic network graph comprises: computing multiple communities based on the topic network graph; sorting the multiple communities by a number of users within each of the multiple communities; selecting a number n of the communities with the largest number of users, wherein a cumulative sum of the users in the n number of the communities at least meets a percentage threshold of a total number of users in the topic network graph; and establishing users in unselected communities as the outlier nodes.

12. The computing system of claim 11 wherein the users that at least one of consume and generate content comprising the topic are considered the users related to the topic.

13. The computing system of claim 11 wherein, in the topic network graph, an edge defined between at least two users represents a friend connection between the at least two users.

14. The computing system of claim 11 wherein, in the topic network graph, an edge defined between at least two users represents a follower-followee connection between the at least two users, and wherein one of the at least two users is a follower and the other of the least two users is a followee.

15. The computing system of claim 11 wherein, in the topic network graph, an edge defined between at least two users represents a reply connection between the at least two users, and wherein one of the at least two users replies to a posting made by the other of the at least two users.

16. The computing system of claim 11 wherein, in the topic network graph, an edge defined between at least two users represents a re-post connection between the at least two users, and wherein one of the at least two users re-posts a posting made by the other of the at least two users.

17. The computing system of claim 11 wherein the ranking comprises using a PageRank algorithm to measure importance of a given user within the topic network graph.

18. The computing system of claim 11 wherein the ranking comprises using at least one of: Eigenvector Centrality, Weighted Degree, Betweenness, and Hub and Authority metrics.

19. The computing system of claim 11 wherein the computing of the multiple communities comprises applying at least one of a clustering algorithm, a modularity algorithm and a community detection algorithm on the topic network graph.

* * * * *